(12) United States Patent
Lagrange et al.

(10) Patent No.: US 8,948,688 B2
(45) Date of Patent: Feb. 3, 2015

(54) METHOD AND SYSTEM FOR MANAGING COMMUNICATIONS IN A WIRELESS COMMUNICATION NETWORK

(75) Inventors: Pascal Lagrange, Rennes (FR); Brice Le Houerou, Acigne (FR); Tristan Halna Du Fretay, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 13/360,040

(22) Filed: Jan. 27, 2012

(65) Prior Publication Data

US 2012/0196527 A1 Aug. 2, 2012

(30) Foreign Application Priority Data

Jan. 31, 2011 (GB) .................................. 1101616.9

(51) Int. Cl.
| | |
|---|---|
| H04B 7/185 | (2006.01) |
| H04L 12/721 | (2013.01) |
| H04W 40/20 | (2009.01) |
| H04B 7/26 | (2006.01) |
| H04W 84/18 | (2009.01) |

(52) U.S. Cl.
CPC ............. H04L 45/70 (2013.01); H04W 40/205 (2013.01); H04B 7/2606 (2013.01); H04W 84/18 (2013.01)
USPC ......................................... 455/13.1; 455/450

(58) Field of Classification Search
USPC .................... 455/13.1, 11.1, 15, 16
See application file for complete search history.

(56) References Cited

U.S. PATENT DOCUMENTS

| | | | |
|---|---|---|---|
| 2004/0001442 A1 | 1/2004 | Rayment et al. | |
| 2007/0286205 A1 | 12/2007 | Johansen | |
| 2009/0116422 A1* | 5/2009 | Chong et al. ................... | 370/315 |
| 2010/0159832 A1 | 6/2010 | Lagrange et al. | |

FOREIGN PATENT DOCUMENTS

| | | |
|---|---|---|
| EP | 2197238 A1 | 6/2010 |
| FR | 2937822 A1 | 4/2010 |
| FR | 2939267 | 6/2010 |

* cited by examiner

*Primary Examiner* — Tu X Nguyen
(74) *Attorney, Agent, or Firm* — Canon USA Inc. IP Division

(57) ABSTRACT

The present invention relates to a method for managing communications in a wireless communications network having a mesh or "relay-based" communication mode operating according to a relay scheme. The network includes network devices defining transmission links between them. The method includes initially detecting a mobile obstacle within the network coverage area; dynamically tracking the detected obstacle by iteratively determining a monitoring area including the detected obstacle; selecting, from the transmission links, a subset of monitoring links belonging at least partly to the monitoring area and monitoring a perturbation level of the selected monitoring links to determine movement of the mobile obstacle in the coverage area; and dynamically adapting the relay scheme of the network based on the belonging or not belonging of the transmission links between network devices to the selected subset.

22 Claims, 12 Drawing Sheets

METHOD AND SYSTEM FOR MANAGING COMMUNICATIONS IN A WIRELESS COMMUNICATION NETWORK

This application claims priority from GB patent application No. 1101616.9 of Jan. 31, 2011 which is incorporated herein by reference.

FIELD OF THE INVENTION

The field of the invention relates to communications networks and more particularly wireless communications networks having a mesh or "relay-based" communication mode.

More specifically, the invention relates to a method for managing communications in such a wireless communications network.

The invention can be applied especially but not exclusively to radio communications networks in which radio communications are liable to suffer fading and/or shadowing due to obstacles.

Throughout the present description, the term "obstacle" is understood to mean any physical item distinct from sending and receiving devices of the network, contained in the overall coverage area of the network and liable to perturb wireless transmission links.

BACKGROUND OF THE INVENTION

Home wireless networks or PANs (Personal Area Networks) are conventionally designed to interconnect communications devices or "network devices", for example digital instruments, telephones, personal digital assistants, speakers, television units, multimedia players situated in proximity to the user. The range of such a communications network is about a few meters.

Even though home networks may be wired, use of a wireless medium is still increasing, which refers to wireless home network or wireless personal area network (WPAN).

The Bluetooth (IEEE 802.15.1), UWB, ZigBee (IEEE 802.15.4), IEEE 802.11e or IEEE 802.15.3 standards are nowadays among the most widely used protocols for wireless communications networks.

The radio transmission systems implemented in these networks currently use a wide range of transmission frequencies, for example 2.4 GHz, 5 GHz and 60 GHz. These frequencies are particularly well suited to data transmission at very high bit-rates over a limited range, for example as a means of connectivity between the different parts of a "home cinema" type communications network.

However, these systems are very sensitive to interference and shadowing phenomena due to the presence of an unexpected obstacle. This generally results in data losses on the communication path between a sending network device and a receiving network device, where the obstacle is located.

In order to overcome data loss, several remedies have been developed. In a first one, the sending network device may repeat the transmission of one piece of data several times. This however reduces its overall transmission bit rate.

In another remedy, relaying network devices may be used in conjunction with the sending network device to provide alternative communication routes or paths, and thus to increase the probability that the receiving network device correctly receives the data. Relaying network devices are well-known by one skilled in the art.

This method involving relaying network devices is usually referred to as a mesh communication method or relay-based communication method depending on whether one or all the network nodes play an active role in determining the strategy of routing/relaying data.

Because such a relay-based communication method requires transmitting the same data several times on the wireless network (from the sending network device to a relaying network device, and then from the relaying network device to the receiving network device), it is preferably used for applications requiring low bandwidth, such as for transmitting control data or command data, or even applications based on audio data communication.

The relay-based communication mode of the wireless network operates according to a relay scheme that defines one or more communication routes between pairs of sending and receiving network devices and also defines allocation of the network medium accesses to the network devices.

The routes may be a single transmission link between the sending network device and the receiving network device, or may involve one or more relaying network devices between them, i.e. several transmission links.

As known by one skilled in the art, the routes are usually stored in routing tables spread over the network.

On the other hand, applications requiring high bandwidth, such as video applications, should not be handled with such method, since this would require compressing the video data, and thus decreasing the video quality.

Given the amount of data for videos, it is desirable to send them only once over the network. This is achieved by only using the transmission link between the sending network device and the receiving network device, without using relaying network devices.

Several potential communication paths exist for the transmission link between the sending network device and the receiving network device, including a direct communication path, also referred to as line-of-sight or LOS path, and indirect communication paths, also referred to as non line-of-sight or NLOS paths.

In the case of NLOS paths, a relaying of the data is obtained though reflection of the radio signal on walls, objects or obstacles.

The receiving network devices are configured to handle the several copies of data that may be received due to multiple reflections on obstacles, to process only one entire copy.

Such a method involving solely the transmission link between the sending and receiving network devices is referred as a point-to-point communication method.

Both the relay-based communication method and the point-to-point communication method may be implemented in the same wireless communications network.

One may note that the relay-based communication method enables two widely separated network devices to communicate, which could not communicate in a point-to-point communication method due to the long distance between them exceeding for example their transmission/reception range.

The several communication paths, either LOS or NLOS paths, may advantageously be used to set up the sending and receiving network devices (including the relaying network devices since they act as sending and/or receiving devices), in particular regarding their antenna configuration. This is because phase array antennas, also referred to as smart or agile antennas, may be easily configured to match specific communication paths.

A network device may adapt its antenna configuration dynamically according to its operating mode, either a relay-based communication mode or a "point-to-point" communication mode.

This tends to improve the bit error rate for the communications in particular when the network device operates as a receiver.

An illustration of this is the case of a receiving network device that uses a directive antenna pattern, i.e. an antenna with a narrow detecting angle, to receive data from a sending network device that uses a quasi-omni directional antenna pattern, i.e. with a large transmitting angle. In this case, the receiving network device is highly sensitive to any shadowing phenomena that may occur in the communication path linking it to the sending network device, given the narrow detecting angle. Therefore, it is advantageous for the receiving network device to adapt its antenna pattern so as to receive data from a direct or an indirect communication path, depending on the actual level of perturbation of these communication paths.

Publication FR 2 937 822 discloses a method for monitoring a perturbation level of several communication paths to detect and locate the presence of an obstacle causing shadowing in the network coverage area.

In the relay-based communication mode, the efficiency of the network may greatly vary depending on the presence of one or more moving or mobile obstacles in the network coverage area.

Increasing the number of relaying network devices for the same sending network device does not appear to be an appropriate solution, since this would increase the number of times the network is used to relay the same data. This would result in a significant bandwidth overhead and a decreased overall transmission bit rate.

In this context, several other solutions have been provided, such as the method disclosed in publications FR 2 939 271 and FR 2 939 267.

In publication FR 2 939 271, the quality of the communication paths for each receiving network device is monitored to evaluate the receiving capacities of the devices and then the impact of a mobile obstacle on them. The communication routes of the network are thus adapted according to the receiving capacities of the devices, when the impact is considered as critical.

This method has drawbacks. In particular, due to monitoring the whole network coverage area, the network devices level perform unnecessary extra processing since most of the monitored communication paths are not actually perturbed and/or are not used for locating the mobile obstacle.

In publication FR 2 939 267, the quality of a communication path in a perturbed area where an obstacle has been located, is monitored in order to evaluate an absorption level by the obstacle and determine whether the obstacle is a human being. In the affirmative, a security area is defined around the perturbed area, and communications routes are adapted to avoid crossing the security area when using a directive antenna pattern for transmitting.

This method aims at protecting humans from high power electromagnetic radiations.

This management method also suffers from drawbacks.

In particular, it requires extra processing by network devices: a first operation has to be implemented in each network device to monitor the perturbation level of the communication paths so as to determine any perturbed area; and a second operation has to be subsequently implemented in particular network devices to evaluate the absorption level of the obstacles.

There is therefore a need to lighten the processing load on the network devices for tracking the mobile obstacles while appropriately adapting the routing in the network.

GOALS OF THE INVENTION

The invention seeks to overcome the above drawbacks of the prior art at least partly, in particular to provide a solution to the above need.

More specifically, it is an aim of at least one embodiment of the invention to provide a technique to manage the communications in a wireless communications network having a relay-based communication mode.

At least one embodiment of the invention is also directed to providing such a technique to track mobile obstacles at low cost for the network devices.

It is another aim of at least one embodiment of the invention to provide such a technique to enhance the robustness of the relay scheme implemented in the relay-based communication mode of the network.

In other words, it is a goal of the present invention to balance the load of the relaying network devices that may be involved in routing the communications.

It is a goal of one embodiment of the invention to provide such a technique to both track mobile obstacles and enhance the robustness of the relay scheme in a single network monitoring operation at low cost for the network devices.

It is yet another goal of at least one embodiment of the invention to provide such a technique to provide dynamic adaptation of antenna configurations in the network devices when using the relay-based communication mode.

It is a complementary goal of at least one embodiment of the invention to provide such a technique that relies solely on means conventionally used to transmit data in a wireless communications network, i.e. a technique that is simple to implement and costs little.

SUMMARY OF THE INVENTION

The invention provides a light processing load on the network devices when managing the communications in the wireless network.

This firstly results from the selection of only a subset of the transmission links to track the mobile obstacles. This selection makes it possible to limit the obstacle monitoring process to an area neighbouring the mobile obstacle, rather than covering the whole network area. Since only these transmission links are monitored, the averaged processing load on the network devices is greatly reduced compared to the prior art.

This also results from the fact that a single monitoring operation (moreover on a reduced number of transmission links as noted above) is performed as a basis for locating the mobile obstacle and adapting the relay scheme. This avoids multiple operations for some network devices as submitted in the prior art.

The invention also provides robustness of the relay scheme, in particular with respect to the choice of the relaying network devices.

This is because the few transmission links involved in the obstacle monitoring process (i.e. the selected subset) may be discarded when selecting the relaying network devices to define routing paths. The network devices corresponding to such a monitoring link are indeed devoting part of their time to the obstacle monitoring process and may have constrained antenna configurations not adapted to operate (i.e. relay data) according to a relay-based communication mode. Consequently, they do not appear to be the most efficient relaying network devices.

The transmission links not involved in the obstacle monitoring process are, on the other hand and on average, less affected by the presence of an obstacle.

Selecting as a priority the transmission links or the relaying network devices not involved in the obstacle monitoring process therefore increases the robustness of the routing paths that are defined in the relay scheme.

Furthermore, the invention may rely on only conventional network devices, having conventional receiving and sending means. In this respect, the invention does not require additional means to be added to each network device.

To sum up, the invention provides distinction and different use between certain transmission links mainly dedicated to the obstacle monitoring given their spatial proximity to the obstacle, and the other transmission links dedicated to communication between the network devices.

Correlatively, a second object of the invention relates to a system.

A third object of the invention relates to an information storage means, able to be read by a computer system, including instructions for a computer program adapted to implement the method as set out above, when the program is loaded into and executed by the computer system.

A fourth object of the invention relates to a computer program product able to be read by a microprocessor, including portions of software code adapted to implement the method as set out above, when it is loaded into and executed by the microprocessor.

The system, the computer program and the information storage means may have features and advantages that are analogous to those set out above in relation to the method for managing the communications in a wireless communication network.

Optional features of the invention are further defined.

In particular, it is possible for the selected subset of monitoring links to comprise (only) the transmission links defining the edges of the determined monitoring area.

This increases resource processing saving since this configuration involves the minimum number of monitoring links (and network devices) to efficiently track the mobile obstacle. The communication capacities of the network (i.e. the transmission links and the network devices not involved in the monitoring) are at the same time increased.

In a variant, the selected subset of monitoring links (only) includes the transmission links defining the edges of the determined monitoring area and transmission links crossing this area.

Taking into account the area-crossing transmission links gives more accurate location of the mobile obstacle within the monitoring area. Such accurate location can further be used to anticipate the movements of the mobile obstacle, for example to anticipate change or adaptation in the relay scheme.

According to one embodiment of the invention, adapting the relay scheme includes determining routing paths between a sending network device and a receiving network device, wherein determining the routing paths includes:
 selecting relaying network devices amongst the network devices that are not involved in monitoring the selected subset of monitoring links in preference to those that are so involved, to define routing paths via the selected relaying network devices, as long as the defined routing paths do not meet a bandwidth requirement of the sending network device.

This provision gives preference, for routing data, to the transmission links not involved in the obstacle monitoring process. As set forth above, an increased robustness of the relay scheme is thus obtained for the wireless communications network.

According to one particular feature, the transmission links crossing the monitoring area are discarded when determining the routing paths. This is automatically achieved if the subset of monitoring links includes all the transmission links crossing the monitoring area.

Such provision gives a further increased robustness of the relay scheme, since the routing paths defined by the selected transmission links cannot be perturbed or disrupted by the obstacle located in the monitoring area.

According to another feature, determining the routing paths further includes:
 (once and only) if the routing paths defined using the relaying network devices selected in preference cannot meet the bandwidth requirement of the sending network device, selecting relaying network devices amongst the network devices involved in monitoring the selected subset of monitoring links.

The network devices selected at this step are relaying devices of second class since they spend part of their time to track the mobile obstacle, and consequently have their antenna configuration constrained to such monitoring (and thus not configured to send data).

This provision ensures that such second class network devices are selected as a last resort to give the best robustness to the relay scheme, but also to give opportunity to meet the bandwidth requirements when there are not enough first class network devices (i.e. not involved in the obstacle monitoring).

In particular, provision may be made to select a number of relaying network devices amongst the network devices involved in monitoring the monitoring links that is higher than a number of such relaying network devices that is theoretically enough to define routing paths that would exactly meet the bandwidth requirement of the sending network device.

This is because these second class network devices are partly-in-time busy tracking the mobile obstacle. Selecting a higher number of devices, and thus defining a higher number of routing paths, enable compensation of such monitoring activity in order to reach the bandwidth requirement.

As a variant or in combination, the method includes periodically applying, to the selected relaying network devices involved in monitoring the monitoring links, a line-of-sight constraint on their antenna configurations during a receiving mode operated when monitoring the mobile obstacle, and releasing the line-of-sight constraint for the rest of the period.

Adapting the antenna configuration optimizes the efficiency of the method according to the invention since the most sensitive antenna configuration (LOS) is applied to track the mobile obstacle during the monitoring sub-period, while an appropriate different antenna configuration may be used for receiving data during a communication sub-period.

According to a particular feature, not all the relaying network devices have the line-of-sight constraint released at the same time. This makes it possible at any moment to have devices for detecting movement of the mobile obstacle. Of course, appropriate rules to manage the switching of the relaying network devices between the monitoring mode and the relay-based communication mode may be implemented to ensure detection of any movement of the mobile obstacle leaving the monitoring area.

According to one embodiment of the invention, the method may further include:
 determining whether or not the adapted relay scheme provides acceptable load balancing between the network devices with respect to a set of constraints; and
 in case the load balancing is not acceptable, again adapting the relay scheme with additional constraints.

This provision tends to optimize the resource sharing amongst the relaying network devices.

In particular, the constraints may be chosen from:
a maximum duration allowable for a transmission time slot on the network;
a maximum duration allowable for an overall period of a plurality of transmission time slots on the network;
a minimum distance that spatially separates two relaying network devices selected for the same sending network device.

For example, the last constraint increases the spatial diversity when selecting the relaying network devices. It results in a better efficiency of the routing mechanisms in view of hypothetical shadowing or fading or interference.

According to one other embodiment of the invention, during monitoring of a perturbation level of a monitoring link, the receiving network device of the monitoring link has an antenna configured in a directive communication mode in line of sight with the sending network device of the selected monitoring link.

Use of a directive LOS antenna configuration provides a high sensitivity for detecting a mobile obstacle. Further, depending on the absorption level of the obstacle, such directive antenna configuration may still receive data if needed.

According to another embodiment of the invention, the method may further include defining a set of areas from which the monitoring area is determined, wherein defining a set of areas includes:
selecting a reference network device amongst the plurality of network devices, as a first vertex of a first area;
selecting several network devices on the basis of their distances to the reference network device (for example the closest devices) as additional vertices of the first area; and
as long as not all network devices have been selected as a vertex of an area, iteratively selecting one side of a previously constructed area, and selecting at least one non-selected network device to construct a new area that does not overlap any previously constructed area.

This is an easy way to iteratively construct areas splitting the network coverage area. The monitoring area is therefore selected amongst these constructed areas. Conventional mechanisms to estimate the distance between two network devices may be implemented by one skilled in the art.

As a variant, the method may include defining a set of areas from which the monitoring area is determined, wherein defining a set of areas include:
obtaining a location of each network device;
identifying network devices that are peripheral to the network coverage area; and
based on the locations of the peripheral network devices, dividing the network coverage area into a plurality of areas, that may be equally sized for instance.

According to a particular feature for any of the variants, the method may further include updating the defined set of areas while the network devices are spatially moving.

According to another embodiment of the invention, upon detecting a perturbed monitoring link (i.e. with a perturbation level greater than a threshold) at the edge of the current monitoring area, the method further includes selecting, as new monitoring area for the next tracking iteration, another area adjacent to the detected perturbed monitoring link and sharing the same perturbed monitoring link.

This may be implemented when it is considered that a detection of a perturbation level means a movement of the mobile obstacle to leave the current monitoring area.

Alternatively, upon detecting a perturbed monitoring link at the edge of the current monitoring area, the method may further include selecting two areas adjacent to the detected perturbed monitoring link to form a new monitoring area for the next tracking iteration.

This is a more robust but more demanding (because it involves a higher number of devices to monitor the obstacle) way to manage location of the mobile obstacle.

In particular, when two adjacent monitoring areas are monitored to determine the movement of two respective mobile obstacles, upon detecting a perturbed monitoring link at a common edge of the two monitoring areas, the two monitoring areas are kept for the next tracking iteration, until a disambiguation of the obstacles' location is obtained.

This is because it is uncertain, upon detecting the perturbation, whether a first mobile obstacle entered the second monitoring area or the reverse.

Disambiguation may be obtained as soon as a perturbation level is detected on a monitoring link which is not common to the two monitoring areas.

According to another embodiment of the invention, (initially) detecting a mobile obstacle includes monitoring a perturbation level only of transmission links peripheral to the network coverage area.

This provision saves a lot of processing resources in the network, since, for example when no obstacle has been detected in the network coverage area, only the peripheral network devices are involved in monitoring and detecting a mobile obstacle. This means that the rest of the network devices can communicate without reduced resources.

The first monitoring area will therefore be the area in the network adjacent to the transmission link experiencing the detected perturbation.

Of course, there exist other implementations, generally more complex, to detect a mobile obstacle for the first time, possibly more accurately. For example, all the network transmission links may be involved as suggested in publication FR 2 937 822.

According to a feature, the relay scheme defines routing paths to route data from a sending network device to a receiving network device, and defines and assigns network medium access time slots to the network devices.

The wireless network therefore implements time division multiple access (TDMA), and the routing paths may be stored in routing tables that are spread over the network.

According to another embodiment of the invention, the method may include applying the adapted relay scheme to the wireless communication network, wherein applying the adapted relay scheme includes:
entering the wireless communication network into a switching mode for a first predetermined time period, where the adapted relay scheme is propagated from network device to network device in the header of the transmissions performed by the network devices according to the relay scheme before adaptation; and
upon expiry of the switching mode time period, entering the wireless communication network into a working mode wherein the network devices communicate according to the adapted relay scheme received.

These two steps (switching and then working) are particularly adapted to an ad-hoc wireless network where a substantial number of transmission cycles is required to propagate any information to the ends of the networks. Thus, use of this information cannot be made before the expiry of these transmission cycles according to the "old" information.

In particular, the working mode of the wireless communication network according to the adapted relay scheme is maintained at least during a second predetermined time period. This second time period aims at preventing frequent reconfigurations of the wireless medium access sequence or "transmission sequence" in the network (i.e. too close in time), which would generate instability in the network.

BRIEF DESCRIPTION OF THE DRAWINGS

Still other particularities and advantages of the invention will appear in the following description, illustrated by the accompanying drawings, in which.

DETAILED DESCRIPTION OF EMBODIMENTS OF THE INVENTION

Figure 1:
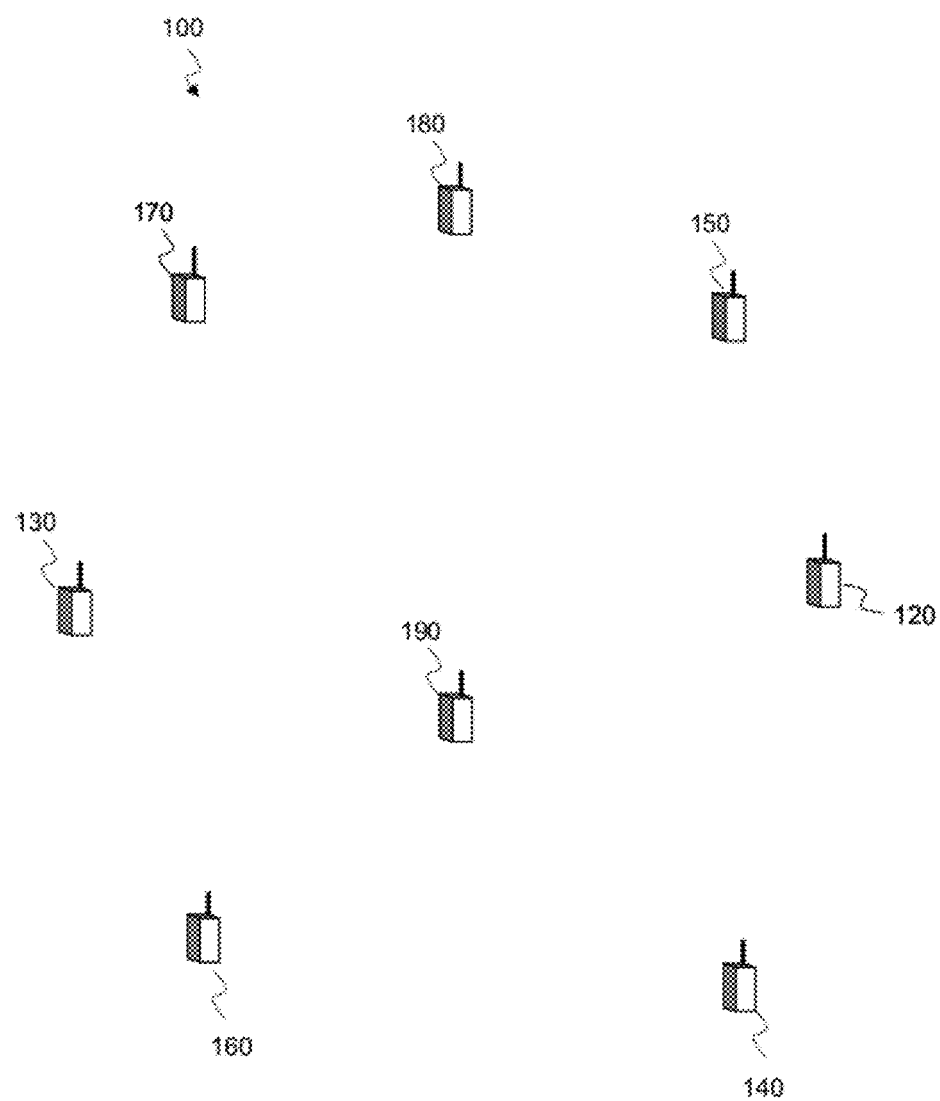
FIG. 1 schematically illustrates a wireless communications network, wherein the invention may be applied.

FIG. 1 schematically illustrates a wireless communications network, wherein the invention as disclosed here after may be applied.

The network 100 of FIG. 1 is a wireless communications network comprising a plurality of network communication devices 120, 130, 140, 160, 150, 170, 180, 190.

Even though the network devices 120, 130, 140, 160, 150, 170, 180, 190 may implement only a sending function or a receiving function at a given time, they preferably embed both these functionalities. In this respect, they are referred to as sending/receiving network devices.

In the embodiments detailed herein, the wireless communications network 100 is a TDMA network, wherein a transmission cycle, also referred to as a TDMA cycle, follows a transmission cycle, and wherein a transmission cycle is divided into time slots, as illustrated below with reference to FIG. 2.

The invention may also be applied in other kinds of wireless communications network, such as CDMA (standing for "Code division multiple access") and FDMA (standing for "Frequency division multiple access") networks, in which cases codes or frequencies are assigned to sending network devices instead of time slots.

According to the TDMA mechanisms, there is only one sending network device that transmits radio data during each time slot, so as to avoid interference.

Given this particularity of the TDMA network, each sending/receiving network device may comprise only one phase array antenna, used for both sending and receiving radio data depending on the current time slot.

Figure 2:
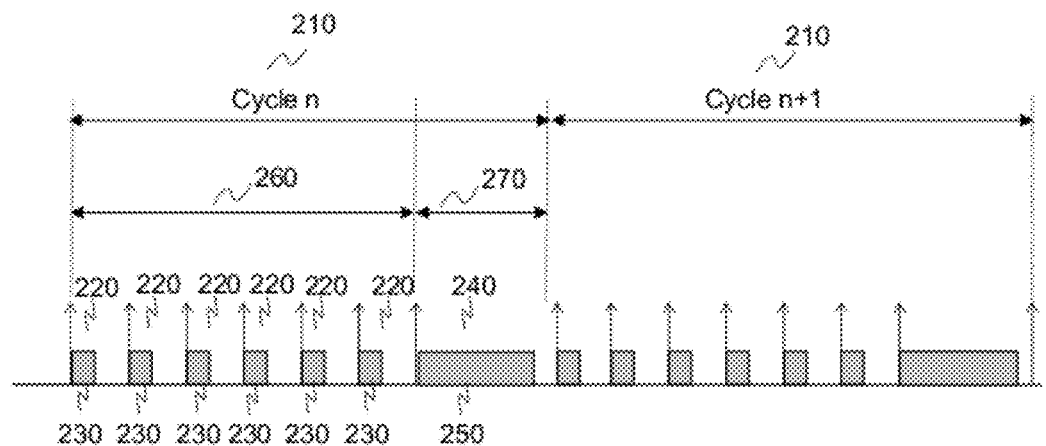
FIG. 2 illustrates the time divided access to the physical medium of the wireless communications network of FIG. 1.

FIG. 2 illustrates the time divided access to the physical medium of the wireless communications network 100. The time is divided into TDMA cycles 210, and access to the physical medium for data transmission is thus shared in time between the network devices 120, 130, 140, 160, 150, 170, 180, 190.

In FIG. 2, only two communications or TDMA cycles 210 are shown.

The same structure is used for several consecutive communications cycles 210. Occasionally, for example when a relay scheme has been updated or adapted as described below, the structure of the communications cycles may be modified. Given the repetitiveness of the communications cycles 210, they are referred to as superframe without distinguishing between them in the following disclosure.

A TDMA cycle 210 is divided into time slots 220, 240, each time slot 220 and 240 being allocated to a single sending network device.

As shown in the figure, a TDMA transmission cycle 210 comprises a mesh or relay-based (RB) communications period 260 made of the first time slots 220 (referred to as RB time slots) and a point-to-point (PTP) communications period 270 made of the last time slot(s) 240 (PTP time slot), as set up in the wireless communications network of FIG. 1.

According to various embodiments, one time slot 220 may be allocated to each sending network device of the wireless communications network 100, or several time slots 220 may be allocated to a single sending network device of the wireless communications network 100, or the point-to-point communications period 270 may have several PTP time slots or no PTP time slot.

PTP time slots 240 are typically used to transmit a large amount of data in real-time, such as video data, since the point-to-point communications mode implemented during period 270 is very appropriate. PTP time slots 240 may be longer than the RB time slots 220 to enable transmission of a large amount of video data. During a PTP time slot 240 the sending network device transmits a radio frame 250.

Figure 11:
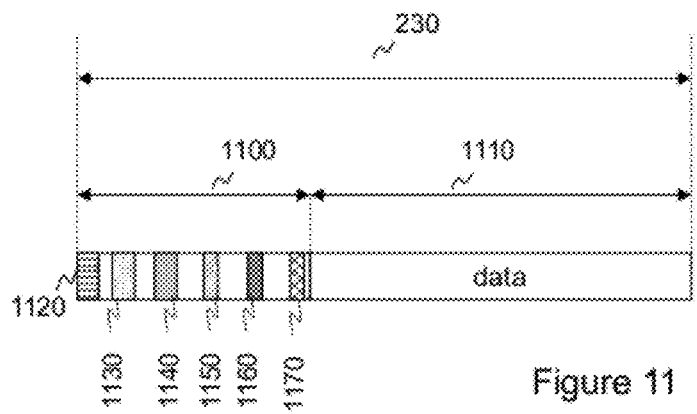
FIG. 11 schematically illustrates a radio frame involved for propagating a new bandwidth allocation resulting from a new relay scheme produced by the steps of FIGS. 9 and 10.

RB time slots 220 are preferably used for transmission of audio data or control data requiring much less bandwidth than video data. This transmission may thus rely on the relay-based communications mode of the wireless communications network 100. During a RB time slot 220 the sending device transmits a radio frame 230 as shown in FIG. 11.

RB time slots 220 are used in a relay-based communications mode of the network 100, which is further described here below with reference to FIG. 5.

In a relay-based communications mode, point-to-multipoint communications are set up to allow broadcasting of data throughout the wireless communications network 100 (e.g. control data) or to perform data relaying according to a relay scheme.

Data relaying means that one or more network devices act as relay of radio data, from a sending network device to a receiving network device. The network devices acting as relay are referred to as relaying network devices for the disclosure below.

The relay scheme for example defines one or more communication routes between pairs of sending and receiving network devices, and defines allocation of the TDMA time slots to the network devices. The routes may involve a single transmission link between the sending network device and the receiving network device, or may involve one or more relaying network devices between them, i.e. several transmission links.

Once calculated, the relay scheme may be exchanged between the network devices, or it may be calculated by each of these devices using the same algorithm and the same parameters.

Data relaying based on the relay scheme ensures that any data is indirectly received by its addressee (the receiving network device) at least once.

In the mesh or relay-based communications mode, the sending network device preferably uses an isotropic antenna or the like (i.e. with a wide beam or wide angle) and the receiving network device preferably uses a directive antenna (pointing to the sending network device).

Using a directive configuration of antenna is advantageously easy to implement but is, on the other hand, highly sensitive to shadowing. This is because a directive narrow beam may be easily blocked or modified by an obstacle, resulting in disruption of the communication between the sending network device and the receiving network device.

Directive antenna configurations are therefore well adapted to the relay-based communications mode in which data may be repeated or relayed. On the contrary, they are not adapted to the point-to-point communications mode since data cannot be repeated or relayed without substantially affecting the end-to-end quality, due to the necessary compression required for a real-time transmission of a large amount of video data.

The settings used for the receiving network device to set up a directive antenna may be obtained during an initialization period, during which each receiving network device applies a beam steering technique to scan until a predefined pattern is received from each sending network device. This initialization period generally lasts more than one TDMA cycle 210 in order for the receiving network device to receive a radio signal from every sending network device involved in the TDMA cycle.

Several acceptable directive antenna settings may be found by the receiving network device during this initialization period, corresponding to either line-of-sight LOS or non line-of-sight NLOS communication paths.

Depending on the situation, a receiving network device dynamically adapts its antenna configuration from one TDMA slot 220 to another, switching between the aforementioned acceptable directive antenna settings found during the initialization period, and may adjust these antenna settings from one TDMA cycle 210 to another if the settings are no longer acceptable (for example, if the received signal falls below a low level).

Figure 3:
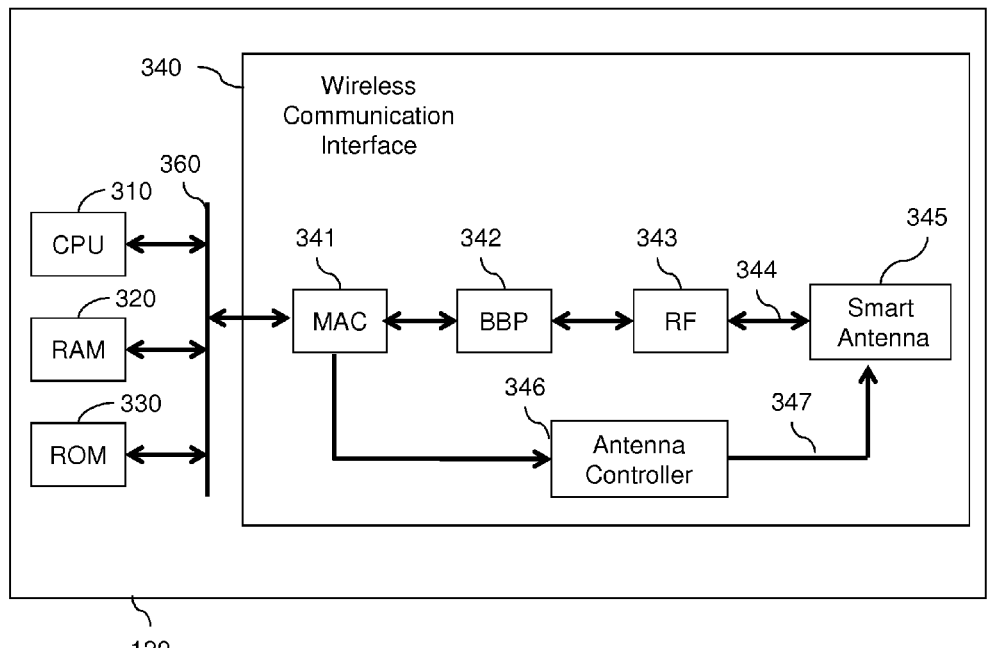
FIG. 3 schematically illustrates the configuration of a wireless network communication device implemented in the invention.

FIG. 3 schematically illustrates the configuration of a wireless network communication device implemented in the invention, i.e. any sending/receiving network device 120, 130, 140, 160, 150, 170, 180, 190 of FIG. 1, for example the network device 120.

The network communication device 120 is configured to perform wireless communications with other network communication devices, using the following units:

a Random Access Memory (denoted RAM) 320, whose capacity can be extended by an additional Random Access Memory connected to an expansion port (not shown in FIG. 3);

a Read-Only Memory (denoted ROM) 330;

a micro-controller or Control Process Unit (denoted CPU) 310; and a wireless communication interface 340, enabling communications with the other wireless network communication devices of the network 100.

CPU 310, RAM 320, ROM 330 and the wireless communication interface 340 exchange data and control information via an internal communication bus 360.

The network communication device 120 can either be a sending network device, a receiving network device or both, and thus a relaying network device.

After the network device 120 has been powered up, CPU 310 controls and directs the execution of instructions or portions of software code of the program of the invention, which are loaded from ROM 330 or from an external memory (not shown in FIG. 3) into RAM 320. Execution of these instructions or portions of software code cause CPU 310 to perform some or all of the steps of the algorithms described hereinafter.

CPU 310 controls the overall operation of the network device 120.

CPU 310 acts as a data analyzer unit, which analyses useful data payload (also referred as MAC payload) of a packet received from another network device, once processed by the wireless communication interface 340.

Turning now to the wireless communication interface 340, this comprises:

an Radio Frequency module (shown as RF unit) 343;

a baseband processor (shown as BBP unit) 342;

a medium access controller (shown as MAC unit) 341;

an antenna controller 346; and a smart antenna 345, further detailed here below with reference to FIG. 4.

The RF module 343 is configured to process a signal output by the baseband processor 342 before it is sent out by means of the smart antenna 345. For example, the processing can be done by frequency transposition and power amplification processes.

Conversely, the RF module 343 is also configured to process a signal received by the smart antenna 345 before it is provided to the baseband processor 342.

The baseband processor 342 is configured to modulate and demodulate the digital data exchanged with the RF module 343. For instance an Orthogonal Frequency-Division Multiplexing (OFDM) modulation and demodulation is applied by the baseband processor 342.

MAC unit 341 manages the accesses to the wireless medium. MAC unit 341 also acts as a synchronization control unit, which controls synchronization relatively to the superframe 210, scheduling the transmissions via the network.

In other words, MAC unit 341 schedules the beginning and the end of an emission of data in the network by the smart antenna 345 during a time slot 220, as well as the beginning and the end of a reception of data from the network by the smart antenna 345.

MAC unit 341 also manages input data required to determine the antenna parameters or settings provided by the antenna controller 346 for configuring the smart antenna 345.

As mentioned above, controlling the smart antenna 345 by phase adjustments of signals in array antennas (also referred as agile antennas) enables the form of the beam to be adapted according to whether the network device is a sending or a receiving device. Greater gain is therefore obtained compared to isotropic antennas.

Controlling by phase adjustments of signals in array antennas is for example addressed in the publication WO 2009/022562.

Figure 4:
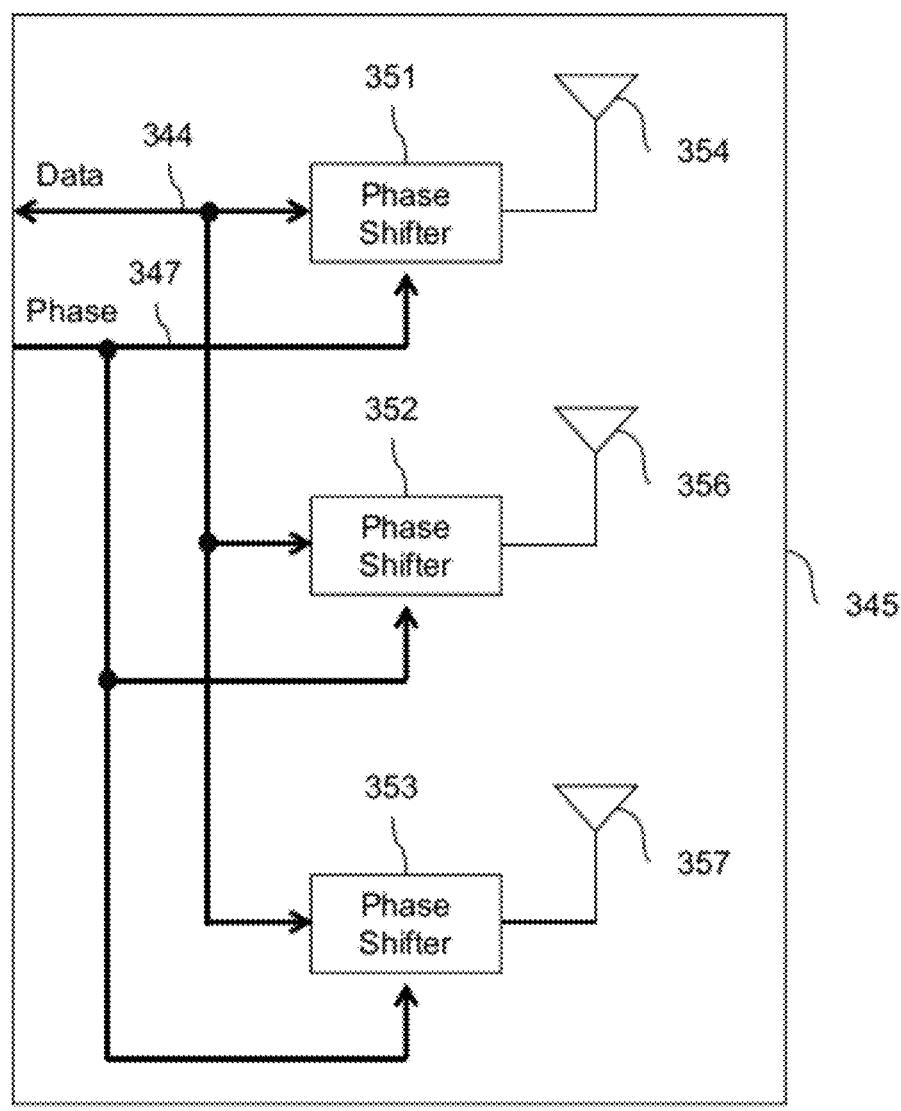
FIG. 4 schematically illustrates a smart antenna of the network device of FIG. 3.

With reference to FIG. 4, the smart antenna 345 of FIG. 3 is now described.

The smart antenna 345 comprises a network (array) of radiating elements or elementary antennas 354, 356, 357, distributed on a given support.

FIG. 4 shows only three radiating elements in the smart antenna 345. However the number of radiating elements may vary depending on the directivity or isotropy desired. For example, in order to obtain narrow beams (with an angle of about a few degrees), a greater number of radiating elements will be implemented.

Each one of the signals emitted or received via the radiating elements 354, 356, 357, is controlled in phase and/or in power using corresponding phase shifters and/or amplifiers 351, 352, 353.

When the network device 120 operates in an emitting or sending mode, the RF module 343 provides to the smart antenna 345 an RF signal 344, which then inputs to all the phase shifters and/or power amplifiers 351, 352, 353. The radiating element 354 (respectively 356, 357) sends the RF signal that may have been phase-shifted and/or amplified by the phase shifter and/or amplifier 351 (respectively 352, 353).

When the network device 120 operates in a receiving mode, the RF signals received by the radiating element 354 (respectively 356, 357), are in turn phase-shifted and/or amplified by the phase shifter and/or amplifier 351 (respectively 352, 353). The signals issued by the phase shifters and/or amplifiers 351, 352, 353, are summed together to obtain the RF signal 344 subsequently input to the RF module 343.

The smart antenna 345 is controlled via the control signal 347.

For illustrative purpose, the control signal 347 may comprise information relative to a set of complex coefficients W1, W2, W3, that have to be respectively applied to the phase shifters and/or amplifiers 351, 352, 353.

In the receiving mode, the complex coefficients W1, W2, W3 configuring the phase shifters and/or amplifiers give abilities to receive radio signals from several directions.

The complex coefficients W1, W2, W3 act on the sensitivity of the antenna when receiving depending on directions of the beam. In particular, the coefficients tend to attenuate the radio signal in undesired directions (reducing sensitivity) and to amplify it in the desired directions (increasing sensitivity).

Similarly, in the sending mode, the complex coefficients W1, W2, W3, define several desired directions where the emission of radio signals has more power.

Therefore, changing the set of complex coefficients W1, W2, W3 changes the form of the beam.

In this respect, it is a goal of the initialization period to determine such coefficients for the receiving mode. A set of complex coefficients may also be defined for the sending mode.

A look-up table is thus provided that is stored for a given set of emission or reception directions and angles, containing a set of corresponding antenna parameters (phase and/or power) to apply to the signals input to or output from the various radiating elements 354, 356, 357.

Figure 5:
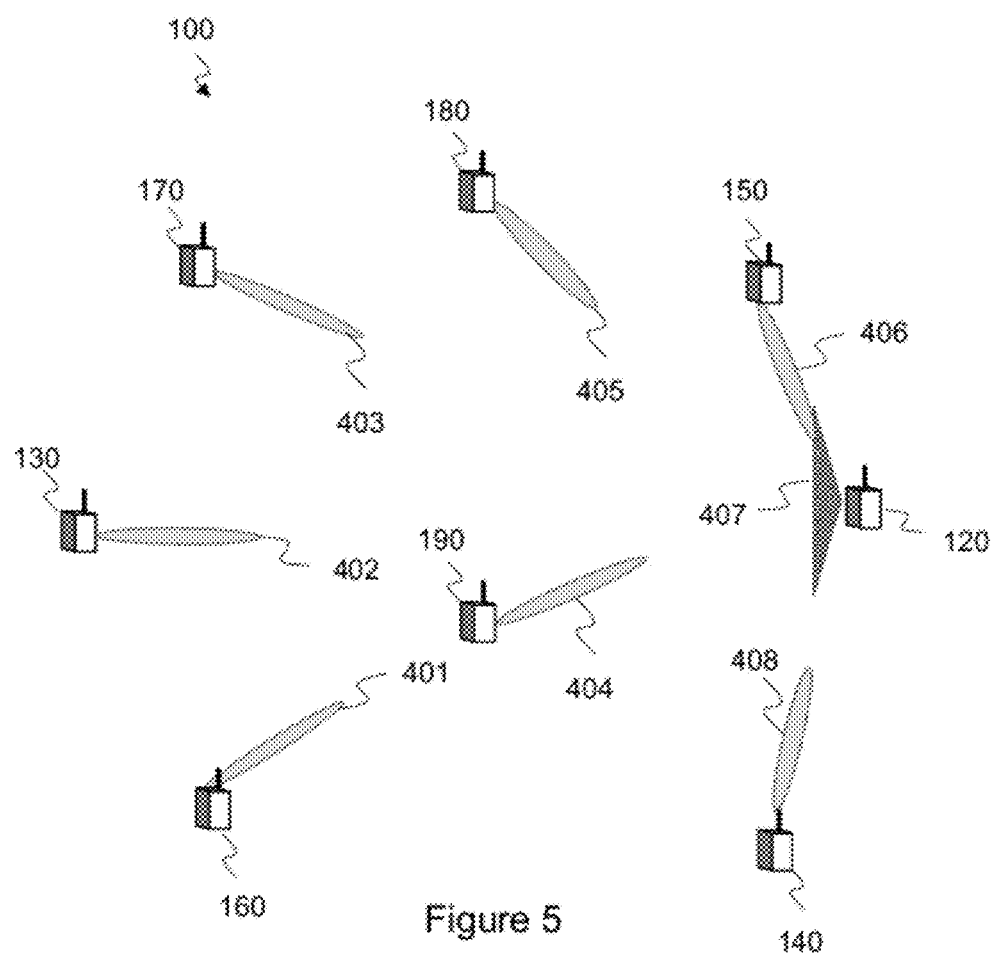
FIG. 5 illustrates the operating process of the wireless communications network of FIG. 1 in a relay-based communications mode.

With reference to FIG. 5, an example of the operating process of the wireless communications network 100 during the relay-based communications period 260 is now described.

Each communication device 120, 130, 140, 150, 160, 170, 180, 190 has been allocated a RB time slot 220 in each TDMA cycle 210. Each communication device 120, 130, 140, 150, 160, 170, 180, 190 may therefore transmit a radio frame 230 during each TDMA cycle 210.

In FIG. 5, the network device 120 is the sending network device, while the network devices 130, 140, 150, 160, 170, 180, 190 are all receiving network devices. This configuration lasts the whole RB time slot 220 that has been allocated to the network device 120.

The sending network device 120 is configured with an isotropic-like antenna. Its antenna 345 is not strictly isotropic, and is said to be quasi-isotropic. Due to isotropy, the antenna generates substantially homogeneous radiation 407 over a wide angle. This homogeneous radiation 407 allows communication simultaneously with all network devices 130, 140, 150, 160, 170, 180, 190 of the network 100 located in the wide angle at a reasonable distance (i.e. not greater than a transmission power limitation).

The receiving network devices 130, 140, 150, 160, 170, 180, 190 are configured with a directive antenna, i.e. with a respective narrow beam 402, 408, 406, 401, 404, 405, 403 pointing in the direction of the sending network device 120. It is recalled here that the direction of the sending network device 120 has been determined during the initialization period where the complex coefficients W1, W2 and W3 have been computed.

At each new RB time slot 220 of a TDMA cycle 210, a new network device 120, 130, 140, 150, 160, 170, 180, 190 becomes the sending network device and the other network devices configure their antenna to point in the direction of the sending network device to receive data from it.

Figure 6:
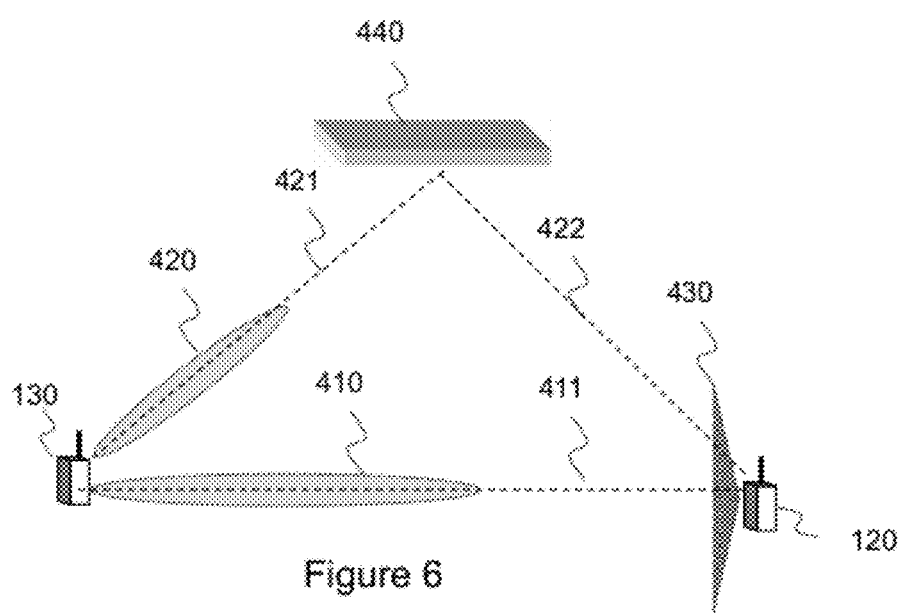
FIG. 6 schematically illustrates a transmission link between two network devices.

FIG. 6 illustrates a transmission link between two network devices 120 and 130 during the relay-based communications period 260.

As shown in the figure, the sending network device 120 uses an isotropic antenna or the like (wide beam 430), while the receiving network device 130 uses a directive antenna configuration (pointing to the sending network device 120) for receiving the data sent by the device 120.

During the initialization period, the receiving network device 130 has determined two valid directive antenna configurations 410 and 420 for receiving the data sent by the device 120.

The directive antenna configuration 410 corresponds to the line-of-sight communication path 411 between the receiving network device 130 and the sending network device 120.

The directive antenna configuration 420 corresponds to a non line-of-sight communication path resulting from the reflection of the sent signal on a passive reflector 440. The non line-of-sight communication path comprises two elementary communication paths 421 and 422 between the receiving network device 130 and the sending network device 120.

The receiving network device 130 has the ability to switch between the two directive antenna configurations 410 and 420, depending on the quality of the associated communication path.

Such quality may be evaluated by measuring the quality of a received signal in terms of SNR (Signal to Noise Ration) or RSSI (received signal strength indicator). One skilled in the art may easily find other metrics to evaluate the quality of radio communication path.

In practice, a strong attenuation detected on the received signal when using the antenna configuration 410 means it is highly probable that an obstacle is located on the line-of-sight communication path 411. Hence monitoring the quality of the signal received from the sending network device 120, when using the antenna configuration 410, allows detection and location of the presence of an obstacle on that line-of-sight communication path 411.

Similarly, a strong attenuation detected on the received signal when using the antenna configuration 420 probably means that an obstacle is located on the non line-of-sight communication path made of the elementary transmission paths 421 and 422. However, since it is not possible to determine whether the obstacle is actually on the elementary path 421 or on the elementary path 422, monitoring the quality of the signal received from the sending network device 120, when using the antenna configuration 420, allows detection of the presence of an obstacle but does not allow this obstacle to be located.

Based on this observation, the antenna configuration 410 appears to be appropriate for both data transmission between the network devices and obstacle location inside the network coverage area.

On the other hand, the antenna configuration 420 appears not to be relevant for obstacle location inside the network coverage area. This is all the more obvious since it is not possible to obtain a location of the reflecting object 440, nor the elementary paths 421 and 422.

For this reason, during monitoring of a perturbation level of a monitoring link to detect or track an obstacle, the receiving network device of the monitoring link has preferably an antenna configured in a directive communication mode in line of sight with the sending network device of the monitoring link.

Figure 7:
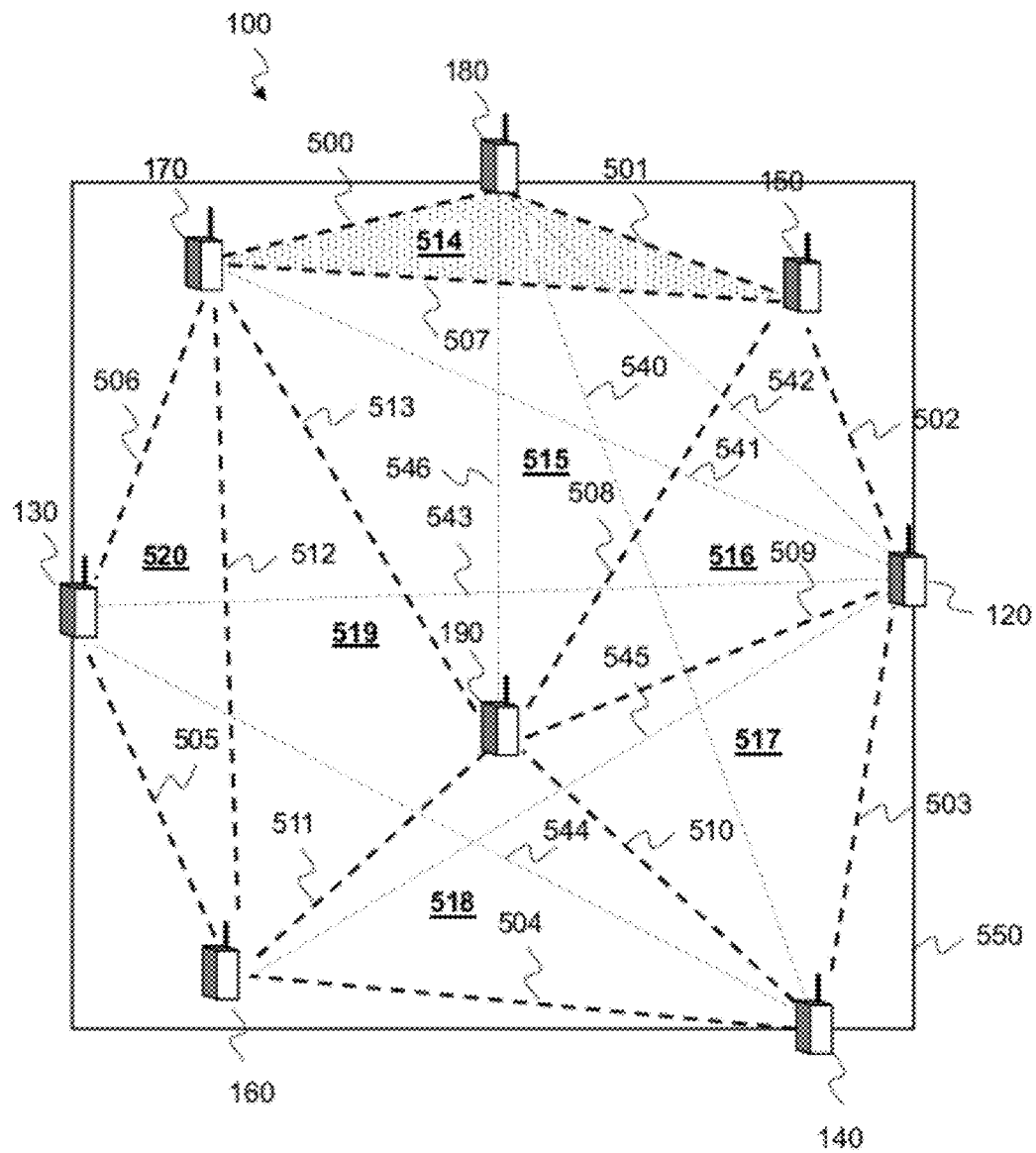
FIG. 7 illustrates the transmission links, the neighbourhood areas and the monitoring areas according to the invention.

Based on such capability of the devices to detect an obstacle within the network coverage area, a description is now made of the obstacle location process as well as the definition of spatial neighbourhood areas in the network 100 during the relay-based communications period 260, with reference to FIG. 7.

This figure shows a plurality of transmission links (or radio links) 500-514 and 540-546 between pairs of network devices. The presence of transmission links relies on the capacity of two network devices to exchange data. For example, if two network devices are too far from each other (i.e. one is not within the transmission or reception range of the other), there is no transmission link between them (see for example between network devices 160 and 180 in FIG. 7).

The detection and location of an obstacle within the network coverage area are both based on the analysis by the network devices of all or part of the transmission links between them, as previously introduced in relation with FIG. 6.

In this respect, some network transmission links may preferably be used to detect an obstacle.

For example, according to one embodiment of the present invention, the transmission links used to detect an obstacle within the network coverage area may be all or part of the peripheral transmission links of said coverage area, i.e. links 500, 501, 502, 503, 504, 505 and 506 as illustrated in FIG. 7. This is particularly efficient when no obstacle is actually within the network coverage area, since the first transmission links that would be perturbed by a mobile obstacle are the peripheral ones.

In a variant, the method of locating obstacles as described in above-referred publication FR 2 937 822 may be implemented to obtain more accurate locations of the obstacles. However, this would require monitoring the quality of every transmission link between each pair of the network devices 120, 130, 140, 150, 160, 170, 180 and 190.

As explained above in relation with FIG. 6, the receiving network devices involved in the obstacle detection process preferably implement a directive antenna configuration allowing operation of the line-of-sight communication path with the sending network device. In other words, they preferably implement the configuration 410 of FIG. 6.

In this case, even though the quality of the transmission link is poor (i.e. signal attenuation is greater than 3 dB, for instance), the receiving network device will not adapt its antenna configuration as described in FIG. 6, keeping to the line-of-sight configuration for obstacle detection and location purposes.

Thus, the transmission links used for detecting the presence of an obstacle within the network coverage area are less robust for conveying data than those not involved in the obstacle detection process.

These mechanisms permit to initially detect a mobile obstacle within the network coverage area, and thus to define an initial location of the obstacle, either roughly or accurately, so as to be able to perform the next step of the invention as described below.

Once the presence of the mobile obstacle has been detected within the network coverage area, there is a need to track the mobile obstacle, i.e. to dynamically track the movements or location of the obstacle.

In this respect, a monitoring area including the detected mobile obstacle is determined and associated with this obstacle. Such monitoring area may be selected from a predefined set of neighbourhood areas and the association made using for example an identifier of the corresponding neighbourhood area(s).

The neighbourhood areas have been preferably defined in advance during an initialization step performed by all the network devices.

In a preferred embodiment, a four-step initialization is implemented as follows.

In a first step, the network devices select a network device as a reference device, let's say the network device 140. This device 140 defines a first vertex of a first neighbourhood area.

The network device 140 may be chosen, in a preferred embodiment, by a particular network device in the network, also referred as a master network device or by all the network devices, based on the location of the device 140, for instance.

In a second step, the first neighbourhood area is computed, starting from the reference device 140 as first vertex.

In a preferred embodiment where the neighbourhood areas are triangles, the two other vertices are the two network devices considered as the closest network devices to the reference network device 140. Conventional techniques to compute the distances between network devices may be used.

This results in building the triangle 517 whose vertices are the devices 140, 120 and 190, and whose edges are the transmission links 510, 503 and 509.

Of course, the neighbourhood areas may be any polygons, and not necessarily triangles. One skilled in the art will have no difficulty in adapting the present four-step method to areas of different shape.

In a third step, a reference transmission link is chosen from amongst the transmission links constituting the triangles that have already been constructed, here the triangle 517. Let's chose transmission link 509.

In a fourth step, a new neighbourhood area is computed by building a new triangle (and generally a polygon) starting from the reference link 509 and computing the closest non selected network device, here the network device 150.

Thus, the network device 150 enables construction of the triangle 516, whose vertices are devices 150, 120 and 190, and whose edges are the radio links 502, 508 and 509. This new triangle is considered as a new neighbourhood area.

When selecting the closest non selected network device, the new neighbourhood area must not overlap a previously constructed neighbourhood area.

The third and fourth steps are repeated until each network device is selected as a vertex of at least one neighbourhood area (i.e. the vertex of at least one triangle).

This allows the construction, for instance, of a set of areas made of the neighbourhood areas 514, 515, 516, 517, 518, 519 and 520 (delimited by the thick discontinued lines in the figure). An identifier is associated to each of these areas and is known as such by all the network devices.

As a variant of this four-step method, computation of the neighbourhood areas may be based on an analysis of the relative positioning of the network devices.

The network devices situated at the extremes of the network, for example the four most northern/southern/western/eastern devices 140, 120, 180 and 130, may define the network area 550, as shown in the figure.

Then, the network area 550 is divided into a plurality of equal areas, each of which is a neighbourhood area. Parameters for dividing the network area 550 may vary according to the dimensions of the desired neighbourhood areas, the dimensions of the network area 550, etc.

Since it is usual for the network devices of a wireless mesh communication network to move over time, it may be provided to update the defined set of neighbourhood areas while the network devices are spatially moving.

In one embodiment, it may be considered that detecting a perturbation level on a transmission link means that the mobile obstacle is crossing that transmission link. In such a case, a single neighbourhood area may be selected as a monitoring area.

In a more complex variant, since perturbation of a transmission link does not necessarily means crossing of that transmission link by the mobile obstacle, the two neighbourhood areas adjacent to the perturbed transmission link may be selected to form together the monitoring area (except for the peripheral links).

The remainder of the description will refer to the first embodiment, but the invention may implement any embodiment.

Once the monitoring area, where the obstacle has been detected, is selected, selection is made, from the transmission links in the network, of a subset of monitoring links that belong, at least partly, to the monitoring area. Monitoring the perturbation level of each link belonging to this subset of monitoring links allows determination of the movement of the mobile obstacle inside the network coverage area.

"Belonging at least partly to an area" means that at least a part of the transmission link (let consider the LOS path between two devices for example) crosses the area or defines an edge of that area. From this definition, it is clear that a transmission link belonging at least partly to the monitoring area is highly liable to experience interference with the mobile obstacle detected within that area.

In one embodiment, the selected subset of monitoring links may only comprise the transmission links defining the edges of the determined monitoring area. In the case of the monitoring area 514, that means that only the transmission links 500, 501 and 507 are used to detect a movement of the obstacle. The network devices 170, 180 and 150, which are the vertices of the monitoring area 514 are thus the only network devices involved in this monitoring process.

In case the neighbourhood area 514 is not currently associated with a mobile obstacle (i.e. area 514 is not the monitoring area), detecting the presence of a mobile obstacle on either the link 500, 501 or 507 (because an area adjacent to area 514 is the monitoring area) means that a mobile obstacle has entered the neighbourhood area 514. As a consequence, the neighbourhood area 514 is then selected as the monitoring area for the next iteration of tracking the mobile obstacle. This selection may implement associating the neighbourhood area 514 with the mobile obstacle.

In case the neighbourhood area 514 is currently associated with a mobile obstacle, detecting the presence of a mobile obstacle on either the link 500, 501 or 507 means that the mobile obstacle is leaving the monitoring area 514. As a consequence, the monitoring area 514 is then disassociated from the mobile obstacle, and the other neighbourhood area adjacent to the perturbed transmission link is therefore selected as the new monitoring area for the next iteration of tracking the mobile obstacle. For example, area 515 is selected if the transmission link 507 is perturbed.

In a variant to select only the edge transmission link, the selected subset of monitoring links may only comprise the transmission links defining the edges of the determined monitoring area and transmission links crossing that area (for example, considering the LOS path of these transmission links). The transmission links 540, 542 and 546 may be all or in part selected since they cross the monitoring area 514.

A case arises when two adjacent monitoring areas are monitored to determine or track the movement of two respective mobile obstacles. This is because it is uncertain, upon detecting the perturbation on the common transmission link, which mobile obstacle has left its monitoring area to enter the other.

In this case, upon detecting a perturbed monitoring link at the common edge of the two monitoring areas, both monitoring areas are kept (as monitoring areas) for the next tracking iteration, until a disambiguation of the obstacles' location is obtained.

For instance, let's consider a first monitoring area 514 currently associated with a first mobile obstacle, and a second monitoring area 515 currently associated with a second mobile obstacle. Those two areas, 514 and 515, have the link 507 as a common edge. Thus, when the presence of an obstacle over link 507 is detected by either the network device 150 or 170, it is not possible to determine whether the obstacle formerly in the area 514 moved to the area 515 or the obstacle formerly in the area 515 moved to the area 514. In such a case, as long as the ambiguity regarding the actual location of the mobile obstacles remains, both areas 514 and 515 must remain associated with a mobile obstacle.

A disambiguation may be obtained as soon as one of the transmission links 500, 501, 508 and 513 (i.e. not the common link 507) is perturbed. The two obstacles were indeed both in the monitoring area (area 514 or 515) where a perturbation on one of those transmission links is detected.

In a variant, the disambiguation may be obtained by implementing, occasionally, the location method disclosed in publication FR 2 937 822 to promptly resolve the ambiguity. To be precise, the obstacle may be located by computing the intersection between at least two spatial zones corresponding to receiving sensitive zones of at least two network devices. These zones may be chosen close to the currently perturbed zone.

Figure 8:
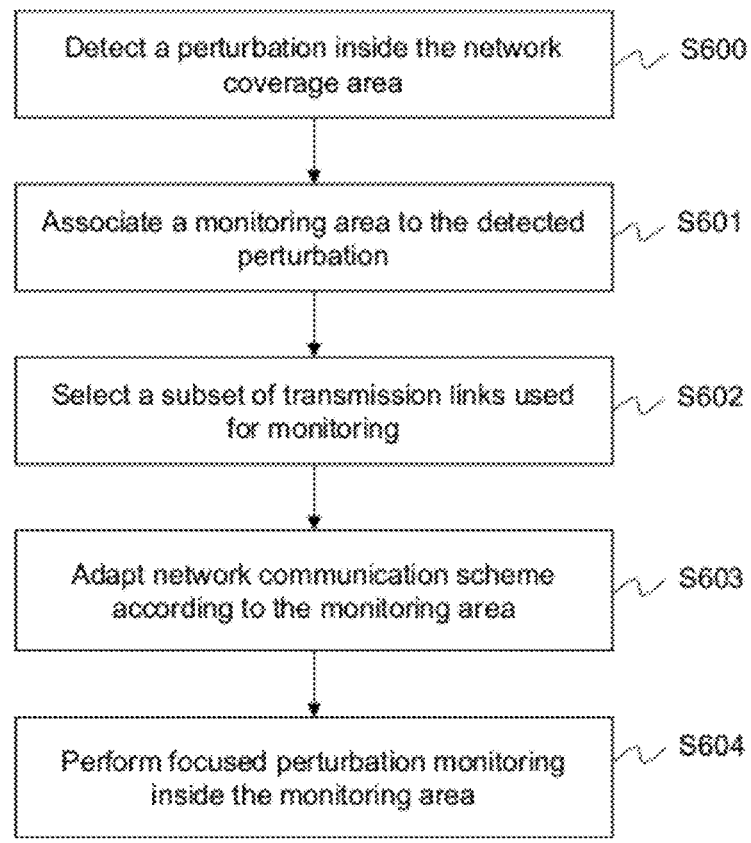
FIG. 8 illustrates, in a flow diagram, the general steps of an embodiment of the invention.

FIG. 8 illustrates, in a flow diagram, the general steps of an embodiment of the invention. These steps aim at dynamically adjusting the relay scheme associated with the relay-based communication mode of the network, given the movements of the mobile obstacles.

This adaptation of the relay scheme dynamically follows the dynamic location and tracking of mobile obstacles within the network coverage area.

The steps shown in FIG. 8 may be implemented in software by executing a set of instructions or a program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

In a first embodiment, the steps of FIG. 8 are performed by each network device of the network 100 in order to dynamically compute a new relay scheme and the associated device/antenna configurations.

In a second embodiment, the steps of FIG. 8 are centrally performed by a central managing device which gathers the necessary information from the network devices 120, 130, 140, 150, 160, 170, 180, 190 of the network 100 and decides for these network devices.

In what follows, the device performing the relay scheme computation steps is referred to as a computing device.

As shown in the figure, in a first step S600, a mobile obstacle is detected on one or more transmission links, for example by detecting, on such a link, a perturbation level higher than a predefined threshold.

This detection may be performed on any of the transmission links of the network when no mobile obstacle is currently present in the network coverage area. It may also be performed on one of the monitoring links of the monitoring area, as defined above in relation with FIG. 7 or below in step S602.

For instance, the receiving network device 150 detects an attenuation of the signal received from the sending network device 180 through the transmission link 501.

Information about detection is thus sent to the computing device.

In a second step S601, determination is made of a monitoring area including the detected mobile obstacle, selected from amongst the neighbourhood areas 514-520. The determined area is associated with the mobile obstacle, to define the current monitoring area as described previously. Of course, several current monitoring areas may be defined for several detected mobile obstacles.

In the example, as a perturbation is detected on the monitoring link 501, while the neighbourhood area 514 is not a current monitoring area (i.e. is not yet associated with any mobile obstacle), the computing device considers that a new mobile obstacle is entering the network 100 through the neighbourhood area 514. Thus the neighbourhood area 514 is selected as the current monitoring area and is associated with the mobile obstacle entering the network, in step S601.

In a following step S602, a subset of monitoring links is selected from the transmission links that belong at least partly to the monitoring area, to monitor each neighbourhood area currently associated with a mobile obstacle.

As previously mentioned, it is possible for these links to be only the transmission links 500, 501 and 507 at the edges of the monitoring area 514. This means that once the monitoring area 514 has been associated with a mobile obstacle, it will remain as such until one of its edge transmission links is perturbed, meaning that the mobile obstacle is leaving that area 514. For example, detecting perturbation on the transmission link 507 generally means that the mobile obstacle is currently moving from the monitoring area 514 to the neighbourhood area 515.

In order to be more accurate in locating the mobile obstacle in the monitoring area, the network devices 120, 130, 140, 150, 160, 170, 180, 190 may also apply the location method described in publication FR 2 937 822 to the transmission links that are intersecting (or crossing) the monitoring area.

For instance, the network devices may consider transmission links 540 and 541 (and even 542) when monitoring the area 515, whose edges are transmission links 507, 508 and 513.

Knowledge of crossing of the monitoring area may be obtained from the location of the network devices.

Once a neighbourhood area has been associated with each mobile obstacle and the monitoring links have been selected, a step S603 is carried out of dynamically adapting the relay scheme of the network. In particular, this may be performed based on the belonging or not belonging of the transmission links between network devices to the selected subset of monitoring links.

This step S603 may also comprise load balancing the network devices in the relay scheme, with respect to a set of constraints, and may also comprise adapting configurations of the network devices (in particular the antenna configurations). This step S603 is further detailed below with reference to FIG. 9.

In a last step S604, a perturbation level of the monitoring links determined in step S602 is monitored to determine movement of the mobile obstacle in the network coverage area. This step lasts until it is determined that the mobile obstacle(s) is/are either leaving the network coverage area or moving to another neighbourhood area. In this last case, the process goes back to step S601 to dynamically determine a new monitoring area and again adapt the relay scheme.

Figure 9:
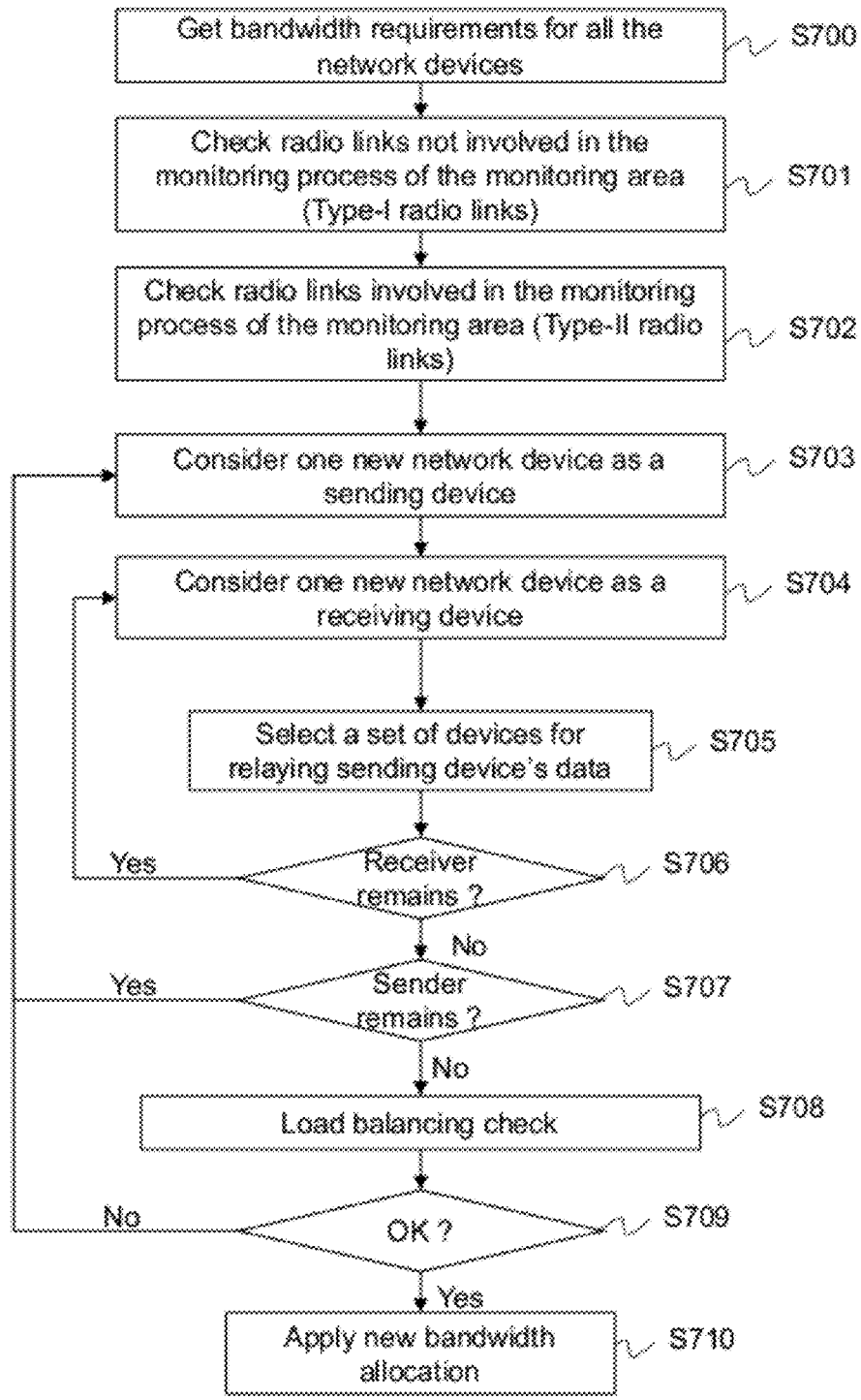
FIGS. 9 and 10 represent flowcharts for adapting the relay scheme of the network, according to an embodiment of the invention.
Figure 10:
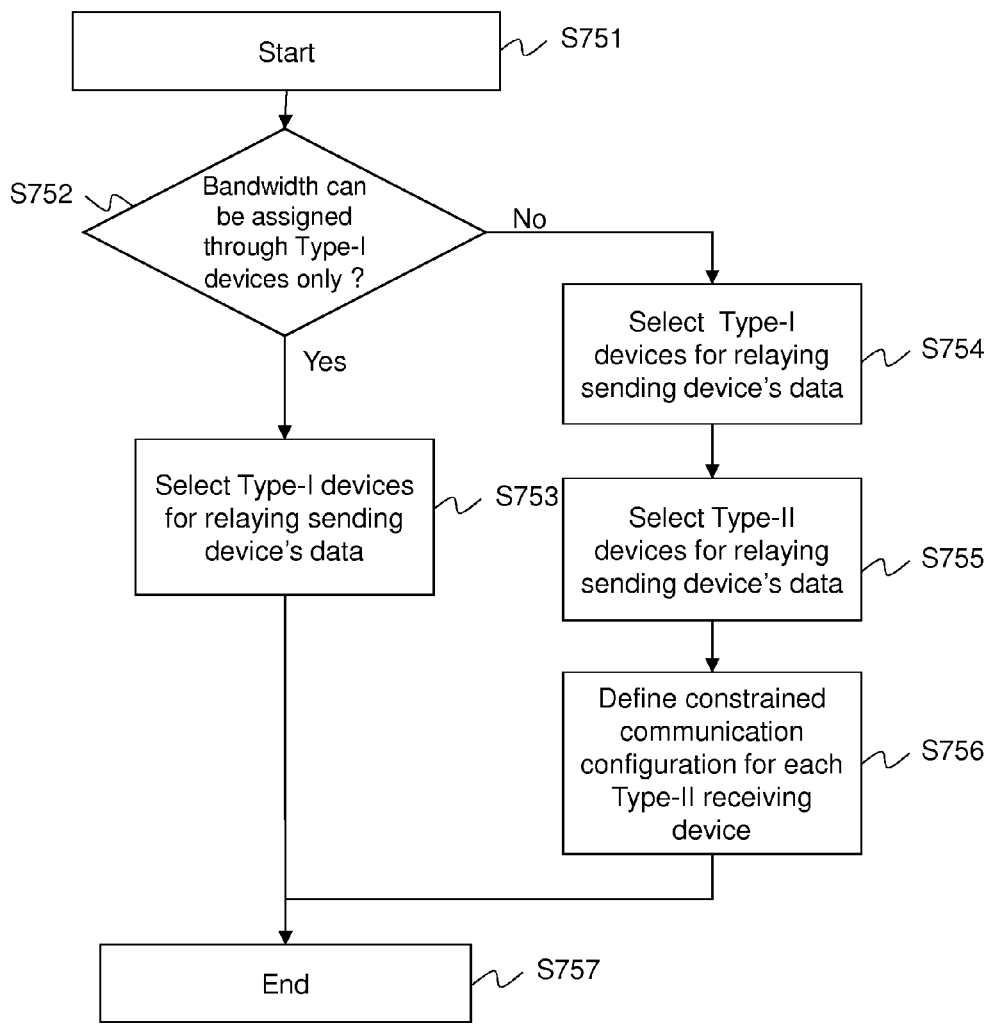

An adaptation of the relay scheme with load balancing of the network devices, as well as an adaptation of the device antenna configurations is now described according to one embodiment of the invention, with reference to FIGS. 9 and 10. These adaptations are implemented in step S603 and are intended for use in a relay-based communication period 260.

Similarly to the general steps of FIG. 8, the steps shown in FIGS. 9 and 10 may be implemented in software by executing a set of instructions or a program by a programmable computing machine, such as a PC ("Personal Computer"), a DSP ("Digital Signal Processor") or a microcontroller; or else may be implemented in hardware by a machine or a dedicated component, such as an FPGA ("Field-Programmable Gate Array") or an ASIC ("Application-Specific Integrated Circuit").

The steps are performed by a computing device which may be either each network device of the network 100 or a central managing device which gathers the necessary information from the network devices 120, 130, 140, 150, 160, 170, 180, 190.

When entering step S603, the monitoring area and the monitoring transmission links have been selected.

As shown in FIG. 9, in a first step S700, the computing device gathers bandwidth requirements for each sending network device of the network devices 120, 130, 140, 150, 160, 170, 180, 190. At a given time, the sending network devices are those to which an RB time slot 220 has been assigned to access the physical medium of the network.

As these sending network devices operate according to the relay-based communication mode, the overall bandwidth assigned to a sending network device includes the bandwidth required for each sending network device to send its data over the shared wireless medium, as well as the bandwidth required for relaying data issued by another sending device.

In a second step S701, the computing device considers the transmission links of the network 100 that are not monitoring links, i.e. not currently used for monitoring the monitoring area or areas currently associated with a mobile obstacle or obstacles.

These transmission links (different from the monitoring links) are referred to as Type-I transmission links, and the subset of such links is denoted S-I.

Similarly in a following step S702, the computing device checks the current monitoring links defined in step S602, i.e. the transmission links of the network 100 that are currently used for monitoring the monitoring area or areas currently associated with a mobile obstacle or mobile obstacles.

The monitoring links are referred to as Type-II transmission links, and the corresponding subset of monitoring links is denoted S-II.

Based on this classification of the transmission links, it is possible to define the Type-I network devices which are involved in only Type-I transmission links, and the Type-II network devices which are involved in at least one Type-II transmission link. The Type-II network devices therefore have their antenna configuration constrained to enable monitoring of the corresponding monitoring link(s), while the Type-I network devices do not have any constraint on their antenna configuration.

In the course of modifying the relay scheme, the computing device now considers each pair of sending network device and receiving network device, amongst the network devices 120, 130, 140, 150, 160, 170, 180, 190, to determine various routing paths that may be used to satisfy the bandwidth requirements.

In this respect, the computing device successively selects each network device as a sending network device (step S703), and for a given sending network device, successively selects each remaining network device as a receiving network device.

For a given pair of sending and receiving network devices, the computing device determines and selects a set of network devices for relaying the sending network device's data to the receiving network device. This is step S705, further detailed in FIG. 10.

The selection of the relaying network devices may be based on constraints, for example constraints such as the belonging or not belonging of transmission links between network devices to the selected subset S-II of monitoring links (Type-II), and/or the fact that the selected links should preferably not have any intersection with the monitoring area.

Step S705 starts at the state S751.

In step S752, the computing device determines whether the bandwidth requirements defined in step S700 for the sending network device considered in step S703 can be satisfied using only Type-I transmission links involving only Type-I network devices.

In other words, the process determines if enough communication paths can be found between the sending network device considered in step S703 and the receiver network device considered in step S704, that do not involve any of the network devices' monitoring links for tracking a mobile obstacle.

In case the bandwidth requirements can be assigned using only Type-I network devices (output "yes" of step S752), the computing device selects, in step S753, a set of relaying network devices from amongst the Type-I network devices involved in the Type-I transmission links found at step S752, that satisfies the bandwidth requirements.

These relaying network devices are selected to be used for relaying the data from the sending network device to the receiving network device.

There results from the transmission links found at step S752 and the relaying network devices selected at step S753, a set of routing paths from the sending network device to the receiving network device. These routing paths form part of the new relay scheme.

There is also determined the number of RB time slots 220 that have to be assigned to the sending network device and the relaying network devices, as well as the corresponding time slot durations. This information also forms part of the new relay scheme.

For instance, let's consider the network device 120 as a sending device and the network device 130 as a receiving device, and the current monitoring area as the neighbourhood area 514 where only links 500, 501 and 507 are monitoring links.

The sending network device 120 needs to send 200 bytes of data to the receiving network device 130, through its assigned radio frame 230 at each TDMA cycle 210.

The receiving network device 130 can use the direct communication path 543 with the sending network device 120, since both the devices 120 and 130 are Type-I devices. This direct communication path may however have an insufficient bandwidth compared to the 200 bytes that have to be sent at each TDMA cycle.

The network device 140 is only involved in the Type-I radio-transmission links 503 and 544, while the network device 160 is also only involved in the Type-I radio-transmission links 545 and 505. Thus, both network devices 140 and 160 are Type-I devices and can be used for relaying the data from the sending network device 120, for satisfying the required bandwidth of 200 bytes per TDMA cycle. An RB time slot 220 of a given duration may be assigned to the sending network device 120, while an RB time slot of a third of the given duration is assigned to each of the relaying network devices 140 and 160.

In case the bandwidth requirements cannot be met using only Type-I network devices (output "no" from step S752), the computing device firstly looks and selects (step S754) a first set of relaying network devices from amongst the Type-I network devices involved in the Type-I transmission links found at step S752. This is similar to step S753.

If there are no Type-I devices available for the Type-I transmission links found in step S752, the computing device directly moves to step S755.

In step S755, the computer device then looks and selects a second set of relaying devices amongst the Type-II network devices.

Preferably, Type-I network devices are first selected defining a routing path made of only Type-I transmission links (S754), and then Type-II network devices are selected defining a routing path comprising the minimum of Type-II transmission links, and Type-II network devices are lastly selected defining a routing path made of only Type-II transmission links (S755).

The selected relaying network devices are used to relay the data from the sending network device to the receiving network device.

Again, the RB time slots 220 are assigned to the sending network device and to each of the selected relaying network devices.

As the Type-II radio-transmission links (monitoring links) are intended for monitoring the perturbation status of the current monitoring area due to the mobile obstacle, the receiving network devices belonging to those monitoring links should preferably have their antenna configuration constrained so as to operate a line-of-sight communication path, as explained above. Furthermore, the probability of those Type-II radio-transmission links being perturbed by the mobile obstacle is significant, as they are used for monitoring the neighbourhood area comprising that mobile obstacle.

For these reasons, the Type-II transmission links appear to be less suitable for carrying and relaying data than the Type-I transmission links.

Given this monitoring functionality of the Type-II devices, they may not be able to use their whole bandwidth (or time slot) to relay data. In order to compensate for such weakness, the computer device may select at least one more relaying network devices from the Type-II devices, than would be theoretically necessary when considering only Type-I devices, such as is done in step S753. For instance, each time a Type-II device is selected for relaying data, a second Type-II device shall also be selected to relay such data.

In addition or alternatively to such over-allocation of relaying network devices, the computing device may, in step S756, define a periodic constrained antenna configuration for the receiving operating mode of each Type-II relaying network device selected at step S755. Indeed, the relaying network devices are first receiving network devices before relaying (i.e. sending) the received data.

For example, the Type-II relaying network devices involved in both the obstacle tracking and data relaying, may operate with a constrained antenna configuration mode (e.g. line-of-sight configuration only) during predefined monitoring periods, while operating with an adaptive antenna configuration mode (i.e. either line-of-sight or non line-of-sight configuration depending on the most efficient communication path) the rest of the time.

The choice of those predefined monitoring periods is made so that not all the Type-II devices are simultaneously operating in non line-of-sight. This is because if all the Type-II devices operate in non line-of-sight antenna configuration, there would no longer be any obstacle tracking during that period.

For instance, let's consider the network device 120 as a sending network device and the network device 180 as a receiving device, and the current monitoring area as the neighbourhood area 514 where the links 500, 501, 507, 540, 542 and 546 are monitoring links.

The sending network device 120 needs to send 200 bytes of data to the receiving network device 180, through its assigned radio frame 230 at each TDMA cycle 210.

The receiving network device 180 can receive data from sending network device 120 through Type-II radio links only.

The network devices 150 and 170, involved respectively in Type-II transmission links 500 and 501 (i.e. Type-II devices), may be used for relaying the data sent by the sending network device 120 to the receiving network device 180. The transmission link 500 may then be operated in a constrained mode (i.e. line-of-sight configuration only) during the even cycles 210, while being operated in an adaptive mode (i.e. either line-of-sight configuration or non line-of-sight configuration) during the odd cycles 210.

Conversely, the transmission link 501 may then be operated in a constrained mode (i.e. line-of-sight configuration only) during the odd cycles 210, while being operated in an adaptive mode (i.e. either line-of-sight configuration or non line-of-sight configuration) during the even cycles 210.

Step S705 ends following step S753 or S756 (see state S757).

Back to FIG. 9, in step S706, it is determined whether all the remaining network devices have been considered as a receiving network device for the sending network device considered in step S703.

If not, the computing device moves back to step S704 to select another receiving network device, and again performs step S705.

Otherwise, the computing device proceeds to step S707 where it is determined whether all the network devices have been considered as a sending network device.

If not, the computing device moves back to step S703 to select another sending network device, and again performs steps S704-S706.

Otherwise, the computing device proceeds to step S708 where it checks if the load balancing between the network devices is acceptable or not, which means that it checks if the load (in particular bandwidth sharing and monitoring functionality) is balanced between the network devices 120, 130, 140, 150, 160, 170, 180 and 190 according to constraints.

For example, the constraints may comprise:
  the RB time slots 220 assigned at steps S753, S754 and S755 must not exceed a first maximum duration;
  the overall relay-based communication period 260 (comprising all the assigned RB time slots) must not exceed a second maximum duration;
  the spatial distance between two selected relaying network devices must not exceed a maximum distance. This aims to provide spatial diversity.

If it is determined that acceptable load balancing cannot be reached, the adaptation of the relay scheme and the bandwidth allocation to the relaying network devices (performed in step S705) are considered as not acceptable.

They are therefore revised and adjusted by moving back to step S703 to again successively select each pair of a sending network device and a receiving network device. Additional constraints may then be applied during step S705 to meet the load balancing requirements considered in step S708.

If no appropriate relay scheme is obtained, the parameters of the constraints (e.g. maximum durations and distance) may be relaxed (i.e. modified).

If it is determined that the load balancing between the network devices is considered acceptable, the computing device moves to step S710 where the relay scheme (i.e. the routing paths and the new bandwidth allocation) resulting from the preceding steps is applied.

Application of the routing paths may be performed by communicating corresponding routing tables to the nodes of the network 100 (i.e. the network devices), so that those routing tables are taken into account starting from the time when the new bandwidth allocation enters in force.

Network devices may also determine on their own the routing tables based on the new routing path constraints resulting from the current monitoring area.

Application of the new bandwidth allocation is now described with reference to FIGS. 11, 12, 13, 14 and 15. The steps of these figures may be implemented in software by executing a set of instructions or a program by a programmable computing machine, such as a PC ("Personal Computer"), a DSP ("Digital Signal Processor") or a microcontroller; or else may be implemented in hardware by a machine or a dedicated component, such as an FPGA ("Field-Programmable Gate Array") or an ASIC ("Application-Specific Integrated Circuit").

First of all, FIG. 11 schematically illustrates a radio frame 230 sent by a wireless network device 120, 130, 140, 150, 160, 170, 180 or 190 during an RB time slot 220 of a TDMA cycle 210. As explained below, this radio frame 230 is used to propagate the new relay scheme, in particular the new bandwidth allocation, from the computing device to all the network devices.

As shown in the figure, the radio frame 230 comprises two sub-parts:
- a first sub-part made of an information header field 1100. This is used to configure the wireless medium access sequence or "transmission sequence" or TDMA sequence, i.e. it defines the various time slots 220 (in duration and order) and the network devices to which they are respectively assigned;
- a second sub-part made of a payload field 1110 enabling a network device to send data such as control information (e.g. bandwidth requirements) or application data (e.g. audio) over the network 110. It is to be noted that the sending network device is the network device to which the current TDMA time slot 220 (of the current radio frame 230) has been assigned according to the header information 1100.

Figure 12:
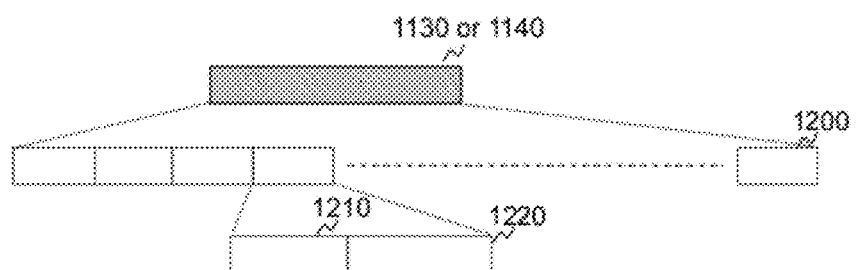
FIG. 12 schematically illustrates a transmission sequence descriptor of FIG. 11.

The information header field 1100 is further made of:
- an identifier 1120 of the current TDMA time slot 220 in which the radio frame 230 is transmitted;
- a descriptor 1130 relative to the current transmission sequence, identifying each successive time slot 220 in the relay-based communication period 160 and their assigned network devices;
- a descriptor 1140 relative to the following transmission sequence. The descriptors 1130 and 1140, further detailed in relation with FIG. 12, are equal when there is no new bandwidth allocation to be applied, and are different when a new bandwidth allocation defined in descriptor 1140 has to be applied;
- an indicator 1150 of a duration of relevance. This gives an indication of the duration of validity of the information 1130 concerning the current transmission sequence;
- an indicator 1160 of a perturbed area, for example the identifier associated with the corresponding neighbourhood area or the identifiers of the network devices at the vertices of the monitoring area. This enables for example the computing device to warn the network devices that a new perturbed area has been detected;
- optionally, a change of transmission sequence indicator 1170 to explicitly notify that a change of the transmission sequence has been requested. The indicator 1170 may however be inserted in the payload sub-part 1110.

The positioning of the header field 1100 inside the radio frame 230, as well as the positioning of the fields 1120, 1130, 1140 and 1150 within the header field 1100, are the same for each radio frame 230 issued during the relay-based communication period 260.

Each sending network device fills in the header field 1110 based on its knowledge.

Based on this information in a received radio frame 230, every receiving network device can therefore determine:
- the transmission sequence currently in use in the network 100, by analyzing the sequence descriptor 1130;
- any new transmission sequence that is going to be used, in descriptor 1140; and
- the position in that transmission sequence of the received radio frame 230, by analyzing the field 1120.

As shown in FIG. 12, a transmission sequence descriptor 1130 or 1140 may comprise a plurality of portions 1200, each having an identifier (used for example when filling in the field 1120) and corresponding to an RB time slot 220 defined in the relay-based communication period 260. The order of the portions 1200 defines the order of the corresponding time slots in the period 260.

The portion or time slot descriptor 1200 comprises the following pieces of information:
- an identifier 1210 of the network device owning the time slot 220. This identifier uniquely identifies a network device in the network 100, and is assigned by a master network device to each new network device as the latter joins the network;
- the duration 1220 of the time slot 220.

These pieces of information are filled in by the computing device when determining or adapting the new relay scheme.

They enable characterization of the allocation and the length of each RB time slot 220, so that each network device receiving the descriptors 1130 and 1140 precisely knows the transmission sequence.

A description is now given of how the information in the header sub-part 1110 is used by the network devices to progressively apply the new bandwidth allocation (i.e. the following transmission sequence).

A master network device amongst the network devices is responsible for managing the operating mode of the network 100. This may be the computing device as mentioned above, or any other network device, in which case that other device receives the adapted relay scheme from said computing device.

Correspondingly, the other network devices are referred to as slave network devices.

Figure 13:
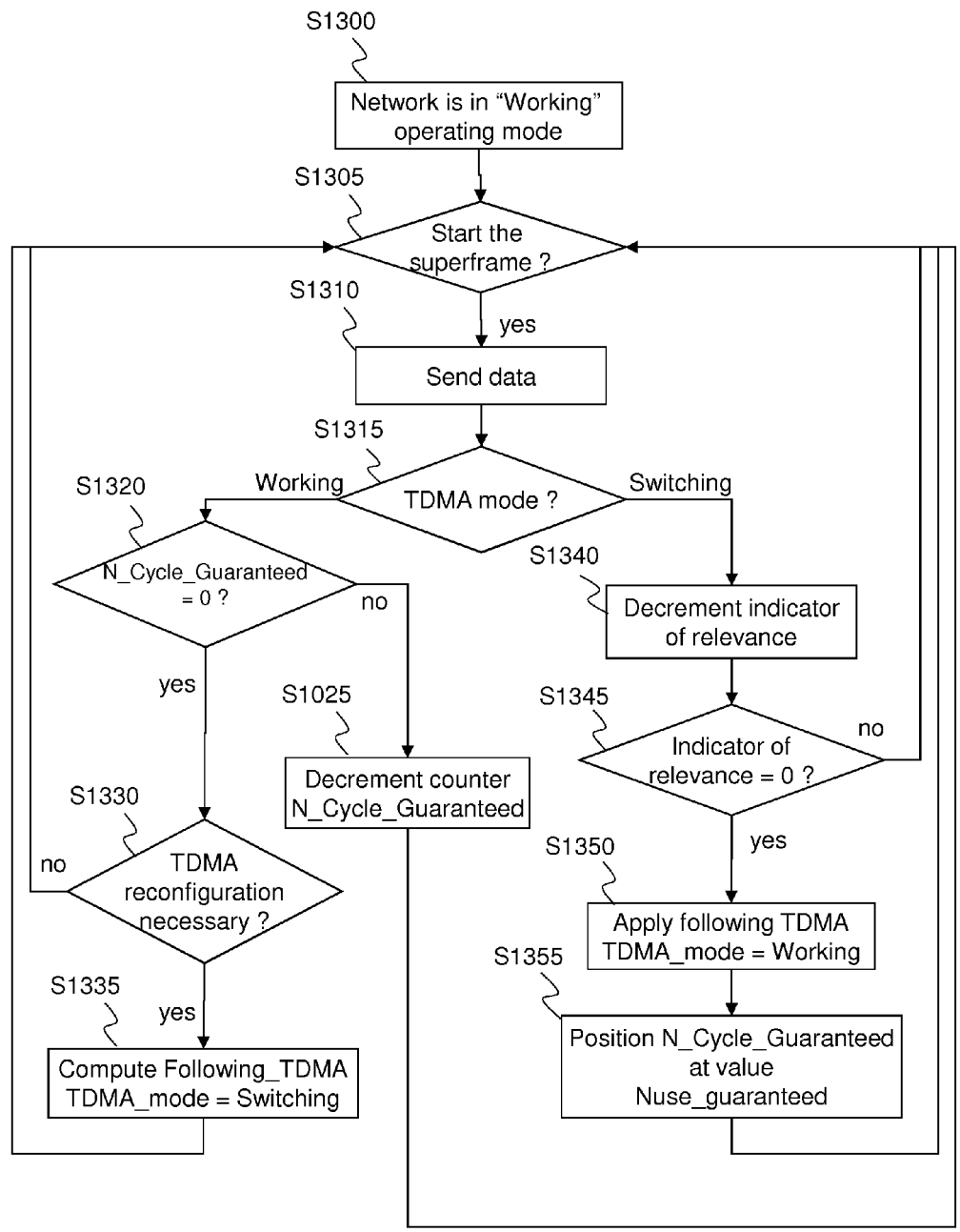
FIG. 13 represents a flowchart for updating applicable transmission sequence information implemented by a master network device.

FIG. 13 illustrates how the master network device manages the updating of the transmission sequence.

Regarding the relay-based communication mode, the network may operate according to two sub-modes:
- a "Working" mode in which a transmission sequence has been defined and is applied by the network devices. This is the case when the current transmission sequence 1130 and the following transmission sequence 1140 in the radio frame 230 are the same;
- a "Switching" mode in which at least one of the information 1130 (current transmission sequence), 1140 (following transmission sequence) or 1160 (indicator of a perturbed neighbourhood area) is modified due, for example, to the detection of a mobile obstacle in the network 100 which triggers an adaptation of the relay scheme as described above. During the corresponding period (switching period) the network devices still operate according to the current wireless medium access sequence.

At an initial step S1300, the network operating mode is "Working".

In order to enable the slave network devices to know the current operating mode and synchronize when applying modifications of the transmission sequence, the master network device updates, at each start of a cycle 210 (beginning of a superframe), the pieces of information inside the header field 1100 of its radio frame 230 to specify the current transmission sequence, any potential following transmission sequence and the currently perturbed neighbourhood area(s) (i.e. monitoring area(s)).

In this respect, the master network device first determines if the current time slot is the beginning of a superframe (step S1305), in which case it sends data including the above update (step S1310).

When the network operating mode is the "Working" mode, the header field 1100 sent during step S1310 comprises the following information:
- the current transmission sequence 1130 (also referred as the current TDMA), which identifies the duration of each of the RB time slots 220 and their assigned network devices;
- the following transmission sequence 1140 (also referred as the following TDMA), which is equal to the current transmission sequence 1130. The values of the descriptors 1130 and 1140 are therefore identical;

the indicator 1150 of duration of relevance which always takes a constant (and maximum) value denoted Nmax (in numbers of TDMA cycles 210), meaning that the current transmission sequence is always valid.

That means that the slave network devices have the value Nmax for as long as they receive data from the master network device. The value local to the slave network devices substantially decrements when they do not receive data from the master network device, due for example to shadowing on a transmission link.

Thus, the closer the information on duration of relevance of a slave network device is to the Nmax value (still in "Working" operating mode), the more reliable is the information obtained by the slave network device.

In the case of shadowing occurring in the network coverage area, this allows a slave network device to send for a longer duration/period than in the prior-art techniques.

It must be further noted that this value is used to determine the maximum duration/period for which a slave network device of the network can keep on sending data over the wireless medium without interfering with other network devices, when said slave network device is subjected to shadowing. This is because, in this case, the slave network device will decrease the value from Nmax to 0, where it will no longer send data. This is also described in detail below with reference to FIG. 14.

For this reason, assuming that Nswitch defines a duration required to apply a new bandwidth allocation (transition duration), Nmax is chosen less than or equal to Nswitch. Let's assume Nmax=Nswitch. This ensures that a slave network device experiencing shadowing will no longer send data when the new bandwidth allocation enters into force (at the expiry of the switching period equal to Nswitch).

When the network operating mode is the "Switching" mode, the header field 1100 sent during step S1310 comprises the following pieces of information:

the current transmission sequence 1130;

the following transmission sequence 1140, which is different from the current transmission sequence 1130. The values of the descriptors 1130 and 1140 are therefore different. The following transmission sequence 1140 describes the new TDMA sequence to be applied for operating the RS time slots 220, given the computation of a new relay scheme as described above;

the indicator 1150 of the duration of relevance which takes a value Nrel, indicating the remaining duration (in terms of cycles 210) before the following transmission sequence 1140 enters into force and is applied by all the network devices in replacement of the current transmission sequence 1130. As noted above, at the beginning of the switching phase between two transmission sequences, Nrel is initialized to Nswitch.

At step S1315, the master network device determines the progress in the TDMA sequence for the next cycle 210. To this end, the communication device determines whether the current network operating mode is "Working" mode or "Switching" mode.

If the current mode is the "Switching" mode, the master network device decreases, at step S1340, the value Nrel of the current duration of relevance by one unit (i.e. by one cycle). This means that the use of the new transmission sequence (following TDMA) 1140 is imminent.

When this indicator reaches zero (test in step S1345), the TDMA sequence re-configuration is performed during the next TDMA cycle 210, as illustrated by step S1350.

Re-configuration means that the transmission sequence currently defined in field 1140 becomes the current transmission sequence in field 1130 for the new TDMA cycle 210. This will result for the slave network devices in applying this new transmission sequence to access the physical medium of the network and thus in applying the new bandwidth allocation.

At the same time, the network operating mode goes back to the "Working" mode.

Optionally, an internal variable denoted N_Cycle_Guaranteed is initialized at a predefined value Nuse_guaranteed corresponding to a minimum number of cycles 210 before any new configuration can occur (i.e. any new transmission sequence can be applied).

This duration (N_Cycle_Guaranteed cycles 210) is aimed at preventing re-configurations of transmission sequence that are too close to one another in time, which could create network instability.

The master network device then moves back to step S1305.

Returning to step S1315, if the current network operating mode is the "Working" mode, the master network device first of all ascertains that a use of the current transmission sequence (current TDMA) after re-configuration has taken place during the minimum Nuse_guaranteed duration. This is done by testing (test s1320) whether or not the current internal variable N_Cycle_Guaranteed has reached the value 0.

As long as this minimum duration has not elapsed (output "no" of test S1320), the internal variable N_Cycle_Guaranteed is decremented by one unit (i.e. by one cycle) at step S1325. The master network device then moves back to step S1305.

When the minimum duration of use of the current transmission sequence has been reached, a new configuration of the TDMA sequence for time slots 220 can be applied, only if necessary.

Such necessity of a new configuration occurs if a new relay scheme has been computed as described previously. Test S1330 makes it possible to determine whether or not a new re-configuration is required.

If no re-configuration is needed, the network operating mode remains the "Working" mode for the next TDMA cycle 210, and the master network device moves back to step S1305.

If a re-configuration is required, the master network device determines the new transmission sequence 1140 (following TDMA) and decides to enter the "Switching" operating mode.

The new transmission sequence 1140 results from the computed new relay scheme.

The indicator 1150 of duration of relevance Nrel is set to Nswitch, to specify to the slave network devices the remaining number of cycles 210 before the new transmission sequence has to be applied simultaneously by them.

Figure 14:
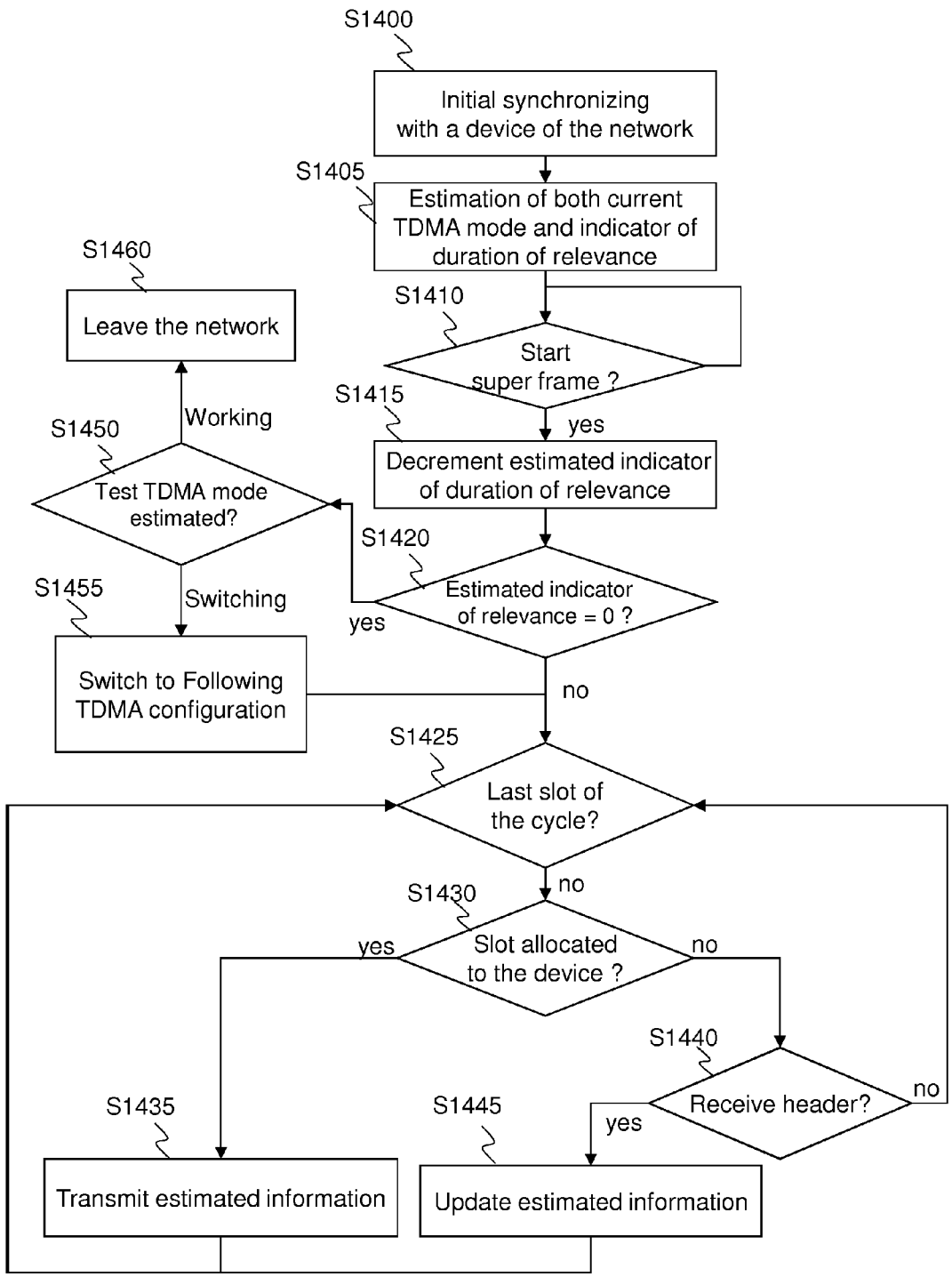
FIG. 14 represents a flowchart for estimating applicable transmission sequence information implemented by a slave network device.
Figure 15:
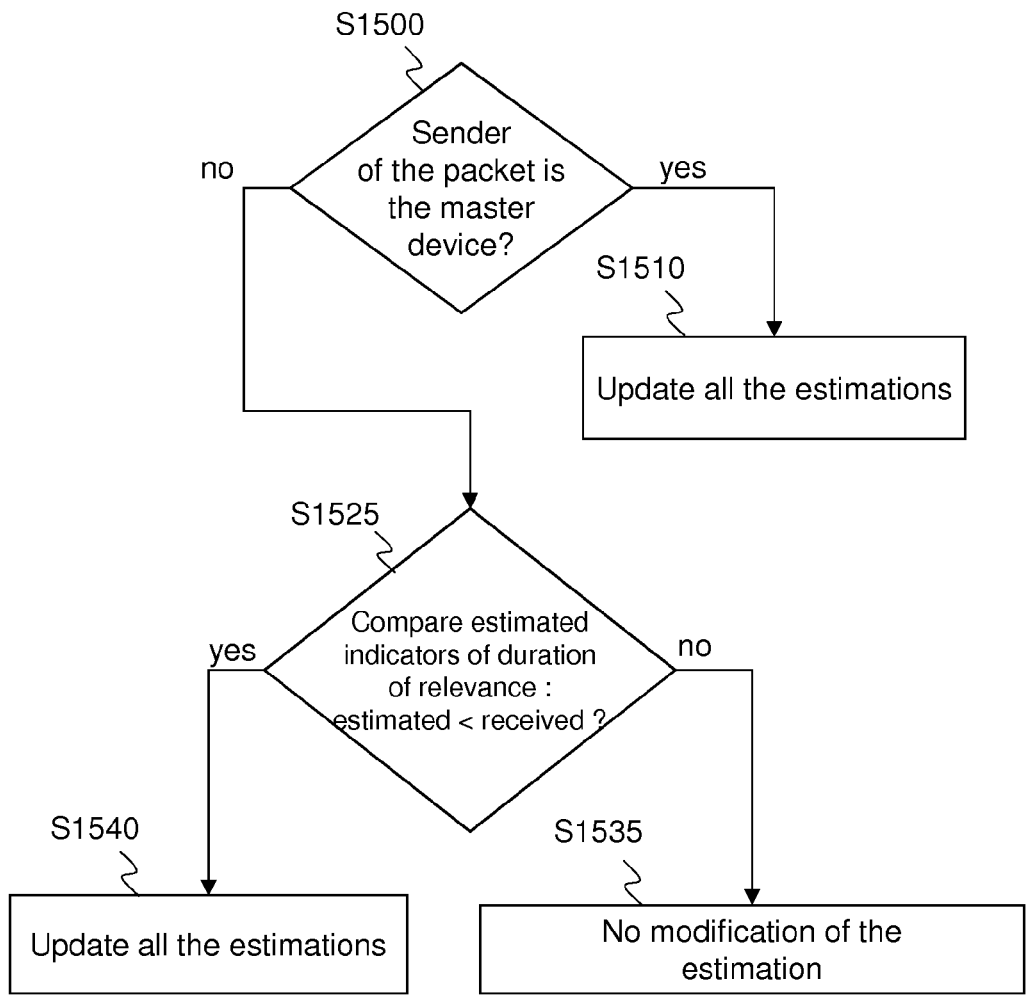
FIG. 15 represents a flowchart for updating the estimation of the applicable transmission sequence information implemented by the slave network device.

FIGS. 14 and 15 illustrate how the slave network devices manage the updating of the transmission sequence.

In particular, FIG. 14 represents a flowchart for estimating current and applicable transmission sequence information implemented by a slave network device.

FIG. 15 represents a flowchart for updating the estimation of the current and applicable transmission sequence information implemented by the slave network device.

With reference to FIG. 14, the slave device waits until it receives at least one signal from one remote network device (either master or slave) in at least one RS time slot 220. This is step S1400.

The slave device then determines at step S1405 whether the remote network device is in "Switching" operational mode or in "Working" operational mode. This determination may comprise a comparison between the descriptors 1130 and 1140 received from the remote network device, or may be based on the optional field 1170.

The slave device also retrieves the value of the indicator of duration of relevance 1150 associated with the current operating mode.

The slave device comprises an internal counter Nrel_estimated which is either synchronized with the received value of the indicator of duration of relevance 1150 or decremented at each TDMA cycle 210.

This guarantees, in the absence of receiving information from another network device, that the slave device cannot send, in the header 1100 of its radio frame 230, information about the transmission sequence that could be valid for more than Nrel_estimated cycles 210.

In this respect, at step S1410, the slave device waits for the next TDMA cycle 210, at which moment it decrements, at step S1415, the internal counter Nrel_estimated.

It is then checked whether this internal counter has reached the critical value 0 (test S1420) in which case the slave device no longer has knowledge of a valid transmission sequence, by which it can access the network 100.

Two possibilities arise according to the estimated network operating mode (test S1450). This is the operating mode that the slave device thinks is currently applied.

If this estimated network operating mode for the slave device is the "Working" mode, the slave device has not received any transmission sequence from another network device for too long.

The slave device has probably undergone shadowing (or is too far from the other devices) such that it is no longer able to guarantee that its estimated operating mode corresponds to the true current mode in the network. It is no longer capable of determining whether its assigned time slot 220 has been modified by the master network device.

The slave device then leaves the network (step S1460).

If this estimated network operating mode for the slave device is the "Switching" mode, a new configuration of the transmission sequence has to be applied at the next TDMA cycle 210. Thanks to the step S1415, the slave device is indeed synchronous with the actual instant of change of transmission sequence from the current TDMA sequence 1130 to the following TDMA sequence 1140.

The slave device is therefore able to take into account, from now on, the new transmission sequence 1140 as the current transmission sequence, whether or not it is experiencing shadowing. In other words, the slave device switches (step S1455) to the following transmission sequence 1140 corresponding to the adapted relay scheme.

As long as the estimation of duration of relevance has not reached the critical value 0 (output "no" of test S1420) or following step S1455, the slave device can keep on receiving and/or transmitting during the new cycle 210.

Test S1425 enables each RS time slot 220 of the current TDMA cycle to be processed successively.

If the current time slot is assigned to the considered slave device (output "yes" of test S1430), the slave device sends (step S1435), in the header 1100 of its own radio frame 230, the content of the information estimated during step S1405.

If the current time slot is assigned to another network device, the slave device receives a radio frame from the assigned network device.

Upon reception of the header 1100 of such a radio frame 230 (step S1440), the slave device may refine and modify the estimation it has performed at step S1405 (step S1445). This update process of the estimation is described in detail with reference to FIG. 15.

It consists in performing a re-updating of the estimation of the network device if the pieces of information received are more relevant than the initial estimation, due for example to moving shadowing. These pieces of information are more relevant either because they are updated upon reception of this information directly from the master network device or from another network device that has more recently received this information from the master network device.

One may note that it can happen that a slave device never receives a radio frame from the master communication device. In this case, thanks to the header received from the other network devices, the slave device relies on the most relevant estimation of the other network devices to remain synchronized with the master network device.

With reference to FIG. 15, in the initial step S1500, it is determined whether the network device from which the information is received is the master network device or another slave network device.

Should the information come from the master communication device (output "yes" of test S1500), the considered slave device automatically updates all of its estimation with the information received from the master network device, at step S1510.

Should the information not come from the master communication device (output "no" of test S1500), the estimated and received indicators of duration of relevance are compared at step S1525.

The indicator of the duration of relevance having the highest value is the information to be kept (step S1540).

This is because such a value for the indicator of duration of relevance indicates that the sending network device has undergone shadowing to a lesser extent and has therefore more recently received confirmation of the validity of its estimated pieces of information from a network device closer to the master network device (or directly from the master network device).

"A network device closer to the master network device" means here a network device for which the pieces of information coming from the master network device have been received through a smaller number of hops (use of relaying network devices) compared to the slave device considered.

If the indicator of duration of relevance received has a value below that of the estimated indicator of duration of relevance, then the network device from which the information has been received has undergone more shadowing than the slave device considered. Since this information is less reliable, no updating of the estimations is done (step S1535).

It may be noted that, since in the "Switching" operating mode the master network device decrements the indicator of duration of relevance at each cycle (as is also done by the slave devices), once the "Switching" mode of operation is detected, the network devices change transmission sequence at the same transmission cycle 210 (i.e. once the indicator of duration of relevance has reached the value 0). This ensures synchronization between all the network devices.

The preceding examples are only embodiments of the invention which is not limited thereto.

The invention claimed is:

1. A method for managing communications in a wireless communication network having a relay-based communication mode operating according to a relay scheme, the network comprising a plurality of network devices defining a plurality of transmission links between them, the method comprising the steps of:

detecting a mobile obstacle distinct from the network devices within the network coverage area;
tracking the detected mobile obstacle by iteratively determining a monitoring area within the network coverage area, edges of the monitoring area being some of the transmission links, and the monitoring area including the detected mobile obstacle;
selecting, from the transmission links, a subset of links, referred to as monitoring links, belonging at least partly to the monitoring area and monitoring a perturbation level of the selected subset of monitoring links to determine movement of the mobile obstacle in the network coverage area;
adapting the relay scheme of the network based on the belonging or not belonging of the transmission links between network devices to the selected subset of monitoring links;
determining whether or not the adapted relay scheme provides acceptable load balancing between the network devices with respect to a set of constraints; and
in case the load balancing is not acceptable, again adapting the relay scheme with additional constraints.

2. The method according to claim 1, wherein the selected subset of monitoring links comprises the transmission links defining the edges of the determined monitoring area.

3. The method according to claim 1, wherein the selected subset of monitoring links comprises the transmission links defining the edges of the determined monitoring area and transmission links crossing this area.

4. The method according to claim 1, wherein adapting the relay scheme comprises determining routing paths between a sending network device and a receiving network device, wherein determining the routing paths comprises selecting relaying network devices amongst the network devices that are not involved in monitoring the selected subset of monitoring links in preference to those that are so involved, to define routing paths via the selected relaying network devices, as long as the defined routing paths do not meet a bandwidth requirement of the sending network device.

5. The method according to claim 4, wherein the transmission links crossing the monitoring area are discarded when determining the routing paths.

6. The method according to claim 1, wherein the constraints are chosen from:
a maximum duration allowable for a transmission time slot on the network;
a maximum duration allowable for an overall period of a plurality of transmission time slots on the network; and
a minimum distance that spatially separates two relaying network devices selected for the same sending network device.

7. The method according to claim 1, wherein during monitoring of a perturbation level of a monitoring link, the receiving network device of the monitoring link has an antenna configured in a directive communication mode in line of sight with the sending network device of the selected monitoring link.

8. The method according to claim 1, further comprising defining a set of areas from which the monitoring area is determined, wherein defining a set of areas comprises:
obtaining a location of each network device;
identifying network devices that are peripheral to the network coverage area; and
based on the locations of the peripheral network devices, dividing the network coverage area into a plurality of areas.

9. The method according to claim 1, wherein detecting a mobile obstacle comprises monitoring a perturbation level of transmission links peripheral to the network coverage area.

10. Information storage means, able to be read by a computer system, comprising instructions for a computer program adapted to implement the method according to claim 1, when the program is loaded into and executed by the computer system.

11. A method for managing communications in a wireless communication network having a relay-based communication mode operating according to a relay scheme, the network comprising a plurality of network devices defining a plurality of transmission links between them, the method comprising the steps of:
detecting a mobile obstacle within the network coverage area;
tracking the detected mobile obstacle by iteratively determining a monitoring area including the detected mobile obstacle;
selecting, from the transmission links, a subset of monitoring links belonging at least partly to the monitoring area and monitoring a perturbation level of the selected subset of monitoring links to determine movement of the mobile obstacle in the network coverage area; and
adapting the relay scheme of the network based on the belonging or not belonging of the transmission links between network devices to the selected subset of monitoring links,
wherein adapting the relay scheme comprises determining routing paths between a sending network device and a receiving network device, wherein determining the routing paths comprises selecting relaying network devices amongst the network devices that are not involved in monitoring the selected subset of monitoring links in preference to those that are so involved, to define routing paths via the selected relaying network devices, as long as the defined routing paths do not meet a bandwidth requirement of the sending network device, and
wherein determining the routing paths further comprises if the routing paths defined using the relaying network devices selected in preference cannot meet the bandwidth requirement of the sending network device, selecting relaying network devices amongst the network devices involved in monitoring the selected subset of monitoring links.

12. The method according to claim 11, wherein selecting relaying network devices amongst the network devices involved in monitoring the monitoring links selects a number of such relaying network devices that is higher than a number of such relaying network devices that is theoretically enough to define routing paths that would exactly meet the bandwidth requirement of the sending network device.

13. The method according to claim 11, further comprising periodically applying, to the selected relaying network devices involved in monitoring the monitoring links, a line-of-sight constraint on their antenna configurations during a receiving mode operated when monitoring the mobile obstacle, and releasing the line-of-sight constraint for the rest of the period.

14. The method according to claim 13, wherein not all the relaying network devices have the line-of-sight constraint released at the same time.

15. A method for managing communications in a wireless communication network having a relay-based communication mode operating according to a relay scheme, the network comprising a plurality of network devices defining a plurality of transmission links between them, the method comprising the steps of:

detecting a mobile obstacle distinct from the network devices within the network coverage area;

tracking the detected mobile obstacle by iteratively determining a monitoring area within the network coverage area, edges of the monitoring area being some of the transmission links, and the monitoring area including the detected mobile obstacle;

selecting, from the transmission links, a subset of links, referred to as monitoring links, belonging at least partly to the monitoring area and monitoring a perturbation level of the selected subset of monitoring links to determine movement of the mobile obstacle in the network coverage area; and adapting the relay scheme of the network based on the belonging or not belonging of the transmission links between network devices to the selected subset of monitoring links; and defining a set of areas from which the monitoring area is determined, wherein defining a set of areas comprises:

selecting a reference network device amongst the plurality of network devices, as a first vertex of a first area;

selecting several network devices on the basis of their distances to the reference network device as additional vertices of the first area; and as long as not all network devices have been selected as a vertex of an area, iteratively selecting one side of a previously constructed area, and selecting at least one non-selected network device to construct a new area that does not overlap any previously constructed area.

16. The method according to claim 15, further comprising updating the defined set of areas while the network devices are spatially moving.

17. A method for managing communications in a wireless communication network having a relay-based communication mode operating according to a relay scheme, the network comprising a plurality of network devices defining a plurality of transmission links between them, the method comprising the steps of:

detecting a mobile obstacle within the network coverage area;

tracking the detected mobile obstacle by iteratively determining a monitoring area including the detected mobile obstacle;

selecting, from the transmission links, a subset of monitoring links belonging at least partly to the monitoring area and monitoring a perturbation level of the selected subset of monitoring links to determine movement of the mobile obstacle in the network coverage area;

adapting the relay scheme of the network based on the belonging or not belonging of the transmission links between network devices to the selected subset of monitoring links, and upon detecting a perturbed monitoring link at the edge of the current monitoring area, selecting, as new monitoring area for the next tracking iteration, two areas adjacent to the detected perturbed monitoring link or another area adjacent to the detected perturbed monitoring link and sharing the same perturbed monitoring link.

18. The method according to claim 17, wherein when two adjacent monitoring areas are monitored to determine the movement of two respective mobile obstacles, upon detecting a perturbed monitoring link at a common edge of the two monitoring areas, the two monitoring areas are kept for the next tracking iteration, until a disambiguation of the obstacles' location is obtained.

19. A system for managing communications in a wireless communication network having a relay-based communication mode operating according to a relay scheme, comprising a plurality of network devices defining a plurality of transmission links between them, wherein the system is configured to:

detect a mobile obstacle distinct from the network devices, within the network coverage area;

track the detected mobile obstacle by iteratively determining a monitoring area within the network coverage area, edges of the monitoring area being some of the transmission links, and the monitoring area including the detected mobile obstacle;

selecting, from the transmission links, a subset of links, referred to as monitoring links, that belong at least partly to the monitoring area and monitoring a perturbation level of the selected subset of monitoring links to determine movement of the mobile obstacle in the network coverage area;

adapt the relay scheme of the network based on the belonging or not belonging of the transmission links between network devices to the selected subset of monitoring links;

determine whether or not the adapted relay scheme provides acceptable load balancing between the network devices with respect to a set of constraints; and in case the load balancing is not acceptable, again adapt the relay scheme with additional constraints.

20. A system for managing communications in a wireless communication network having a relay-based communication mode operating according to a relay scheme, comprising a plurality of network devices defining a plurality of transmission links between them, wherein the system is configured to:

detect a mobile obstacle within the network coverage area;

track the detected mobile obstacle by iteratively determining a monitoring area including the detected mobile obstacle;

select, from the transmission links, a subset of monitoring links belonging at least partly to the monitoring area and monitoring a perturbation level of the selected subset of monitoring links to determine movement of the mobile obstacle in the network coverage area; and adapt the relay scheme of the network based on the belonging or not belonging of the transmission links between network devices to the selected subset of monitoring links, wherein the adapt the relay scheme comprises determining routing paths between a sending network device and a receiving network device, wherein determining the routing paths comprises selecting relaying network devices amongst the network devices that are not involved in monitoring the selected subset of monitoring links in preference to those that are so involved, to define routing paths via the selected relaying network devices, as long as the defined routing paths do not meet a bandwidth requirement of the sending network device, and wherein determining the routing paths further comprises if the routing paths defined using the relaying network devices selected in preference cannot meet the bandwidth requirement of the sending network device, selecting relaying network devices amongst the network devices involved in monitoring the selected subset of monitoring links.

21. A system for managing communications in a wireless communication network having a relay-based communication mode operating according to a relay scheme, comprising a plurality of network devices defining a plurality of transmission links between them, wherein the system is configured to:
- detect a mobile obstacle distinct from the network devices within the network coverage area;
- track the detected mobile obstacle by iteratively determining a monitoring area within the network coverage area, edges of the monitoring area being some of the transmission links, and the monitoring area including the detected mobile obstacle;
- select, from the transmission links, a subset of links, referred to as monitoring links, belonging at least partly to the monitoring area and monitoring a perturbation level of the selected subset of monitoring links to determine movement of the mobile obstacle in the network coverage area; and
- adapt the relay scheme of the network based on the belonging or not belonging of the transmission links between network devices to the selected subset of monitoring links; and
- define a set of areas from which the monitoring area is determined, wherein define a set of areas comprises:
- selecting a reference network device amongst the plurality of network devices, as a first vertex of a first area;
- selecting several network devices on the basis of their distances to the reference network device as additional vertices of the first area; and
- as long as not all network devices have been selected as a vertex of an area, iteratively selecting one side of a previously constructed area, and selecting at least one non-selected network device to construct a new area that does not overlap any previously constructed area.

22. A system for managing communications in a wireless communication network having a relay-based communication mode operating according to a relay scheme, comprising a plurality of network devices defining a plurality of transmission links between them, wherein the system is configured to:
- method for managing communications in a wireless communication network having a relay-based communication mode operating according to a relay scheme, the network comprising a plurality of network devices defining a plurality of transmission links between them, the method comprising the steps of:
- detecting a mobile obstacle within the network coverage area;
- tracking the detected mobile obstacle by iteratively determining a monitoring area including the detected mobile obstacle;
- selecting, from the transmission links, a subset of monitoring links belonging at least partly to the monitoring area and monitoring a perturbation level of the selected subset of monitoring links to determine movement of the mobile obstacle in the network coverage area;
- adapting the relay scheme of the network based on the belonging or not belonging of the transmission links between network devices to the selected subset of monitoring links, and
- upon detecting a perturbed monitoring link at the edge of the current monitoring area, selecting, as new monitoring area for the next tracking iteration, two areas adjacent to the detected perturbed monitoring link or another area adjacent to the detected perturbed monitoring link and sharing the same perturbed monitoring link.

* * * * *